(12) United States Patent
Kume et al.

(10) Patent No.: US 11,132,810 B2
(45) Date of Patent: Sep. 28, 2021

(54) THREE-DIMENSIONAL MEASUREMENT APPARATUS

(71) Applicant: Hitachi, Ltd., Tokyo (JP)

(72) Inventors: Hideyuki Kume, Tokyo (JP); Yuan Li, Tokyo (JP); Masaya Itoh, Tokyo (JP); Masanori Miyoshi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 170 days.

(21) Appl. No.: 16/479,282

(22) PCT Filed: Feb. 1, 2017

(86) PCT No.: PCT/JP2017/003536
§ 371 (c)(1),
(2) Date: Jul. 19, 2019

(87) PCT Pub. No.: WO2018/142496
PCT Pub. Date: Aug. 9, 2018

(65) Prior Publication Data
US 2019/0385324 A1    Dec. 19, 2019

(51) Int. Cl.
*G06T 7/593* (2017.01)
*G06T 7/292* (2017.01)
(Continued)

(52) U.S. Cl.
CPC ............ *G06T 7/593* (2017.01); *G01B 11/002* (2013.01); *G06T 7/292* (2017.01); *H04N 5/247* (2013.01);
(Continued)

(58) Field of Classification Search
None
See application file for complete search history.

(56) References Cited

U.S. PATENT DOCUMENTS 8,547,437 B2 * 10/2013 Buehler .................. G06K 9/32
  348/169
8,811,745 B2 *  8/2014 Farsiu ..................... G06K 9/34
  382/190
(Continued)

FOREIGN PATENT DOCUMENTS

JP    2006-226965 A    8/2006
JP    2006/284372 A   10/2006
(Continued)

OTHER PUBLICATIONS

Devarajan, Dhanya, Zhaolin Cheng, and Richard J. Radke. "Calibrating distributed camera networks." Proceedings of the IEEE 96, No. 10 (2008): 1625-1639. (Year: 2008).*

(Continued)

*Primary Examiner* — Michelle M Entezari
(74) *Attorney, Agent, or Firm* — Mattingly & Malur, PC

(57) ABSTRACT

In a three-dimensional measurement apparatus, a plurality of cameras and an arithmetic device are connected via a network, and includes: a plurality of photographing units; an image acquisition unit; a local time acquisition unit; a moving object detection unit to detect a moving object from the image; an image holding unit to hold an image in which the moving object is detected, in association with the local time at which the image has been photographed; an image selection unit; a three-dimensional position/synchronization deviation estimation unit to estimate a three-dimensional position of the moving object and a synchronization deviation between cameras, from an image selected by the image selection unit and a local time associated with the image; a synchronization deviation holding unit to hold the synchronization deviation; and an output unit to output an estimation result of the three-dimensional position/synchronization deviation estimation unit.

9 Claims, 12 Drawing Sheets

(51) Int. Cl.
*G01B 11/00* (2006.01)
*H04N 5/247* (2006.01)

(52) U.S. Cl.
CPC ... *G06T 2200/04* (2013.01); *G06T 2207/10012* (2013.01); *G06T 2207/10028* (2013.01)

(56) References Cited

U.S. PATENT DOCUMENTS

| | | | |
|---|---|---|---|
| 9,280,565 B1* | 3/2016 | Rizk | G06T 7/0002 |
| 9,460,513 B1* | 10/2016 | Ramalingam | G06T 7/33 |
| 9,565,400 B1* | 2/2017 | Curlander | G08B 25/08 |
| 9,858,713 B2* | 1/2018 | Luo | G06T 17/005 |
| 10,109,104 B2* | 10/2018 | Newman | H04N 5/2253 |
| 10,222,211 B2* | 3/2019 | Chen | G06T 7/11 |
| 10,257,395 B2* | 4/2019 | Uliyar | G06F 21/31 |
| 10,706,549 B2* | 7/2020 | Loui | G06T 7/12 |
| 10,914,605 B1* | 2/2021 | Chen | G06T 7/97 |
| 10,957,074 B2* | 3/2021 | Deng | G06T 7/80 |
| 2006/0222238 A1 | 10/2006 | Nishiyama | |
| 2011/0298603 A1* | 12/2011 | King | G08G 1/042 340/436 |
| 2012/0062748 A1* | 3/2012 | Ofek | G06K 9/00651 348/149 |
| 2013/0084847 A1* | 4/2013 | Tibbitts | H04W 4/48 455/419 |
| 2014/0267733 A1* | 9/2014 | Wu | G08G 1/054 348/149 |
| 2014/0286537 A1 | 9/2014 | Seki et al. | |
| 2017/0076468 A1* | 3/2017 | Krauss | G06T 7/292 |

FOREIGN PATENT DOCUMENTS

| | | |
|---|---|---|
| JP | 2014-99695 A | 5/2014 |
| JP | 2014-109464 A | 6/2014 |
| JP | 2014-186004 A | 10/2014 |

OTHER PUBLICATIONS

Blumenthal, S., Bruynickx, H., Nowak, W. and Prassler, E., 2013, May. A scene graph based shared 3D world model for robotic applications. In 2013 IEEE International Conference on Robotics and Automation (pp. 453-460). IEEE. (Year: 2013).*
Buschel, W., Vogt, S., & Dachselt, R. (2019). Augmented reality graph visualizations. IEEE computer graphics and applications, 39(3), 29-40. (Year: 2019).*
Japanese Office Action received in corresponding Japanese Application No. 2018-565132 dated Mar. 17, 2020.
International Search Report of PCT/JP2017/003536 dated May 9, 2017.

* cited by examiner

THREE-DIMENSIONAL MEASUREMENT APPARATUS

TECHNICAL FIELD

The present invention relates to a three-dimensional measurement apparatus for estimating a spatial position and a size of an object from a plurality of images obtained by photographing the object.

BACKGROUND ART

In recent years, in a field of surveillance, there is an increasing need for an image recognition technology for detecting a position and a size of an object from an image photographed by a photographing device. In a case of applying this image recognition technology to a system using a plurality of photographing devices, it is necessary to narrow down images to be used and reduce a load for transmission and operation since a network load for image transmission and an operation load for image processing become excessive when all images photographed by the plurality of photographing devices are used to estimate a position and the like of the object.

As a technique related to this, for example, paragraph 0066 of PTL 1 describes "from among a plurality of viewpoints other than the first viewpoint, the selection unit 118 selects, as the second viewpoint, a viewpoint that satisfies at least any one of the conditions: an estimation error of the spatial position is smaller than the others; a difference in the image capture times with the reference image is smaller than the others; and the image quality is higher than the others".

That is, there is disclosed a technique for selecting, from among the plurality of viewpoints, one viewpoint satisfying one of the conditions as the second viewpoint, reducing the operation load by using the image obtained from this narrowed second viewpoint, and increasing the estimation accuracy of the object spatial position (see paragraphs 0063 to 0090 of the same document).

CITATION LIST

Patent Literature

PTL 1: JP 2014-186004 A

SUMMARY OF INVENTION

Technical Problem

However, the image recognition technology of PTL 1 is, as described in paragraphs 0026 to 0028 and the like of the same document, on the premise of a system in which common image capture time information obtained from an NTP server, GPS, or the like is added to images captured by different image capturing devices, and the system is to estimate the spatial position of the object by using a plurality of captured images attached with the common image capture time information. Therefore, the image recognition technology cannot be applied to a system in which each image capturing device adds unique image capture time information to a captured image.

Further, in the invention described in PTL 1, only one of: spatial scale such as camera arrangement; or temporal scale such as an amount of a synchronization deviation between cameras, is taken into consideration in selecting an image to be used for estimation. Therefore, an image that is inappropriate to be used for estimation may be selected, and the accuracy of measurement may be lowered.

Solution to Problem

In order to solve the above problems, a three-dimensional measurement apparatus according to the present invention connects a plurality of cameras and an arithmetic device via a network, and includes: a plurality of photographing units; an image acquisition unit to acquire an image from each of the photographing units; a local photographing time acquisition unit to acquire a local time at which the image has been photographed; a moving object detection unit to detect a moving object from the image; an image holding unit to hold an image in which the moving object is detected, in association with the local time at which the image has been photographed; an image selection unit to select an image held in the image holding unit; a three-dimensional position/ synchronization deviation estimation unit to estimate a three-dimensional position of the moving object and a synchronization deviation between cameras, from an image selected by the image selection unit and a local time associated with the image; a synchronization deviation holding unit to hold the synchronization deviation; and an output unit to output an estimation result of the three-dimensional position/synchronization deviation estimation unit.

Advantageous Effects of Invention

According to the present invention, even when unique photographing time information is attached to a photographed image of each photographing device, it is possible to estimate a position and a size of an object with high accuracy by using these photographed images.

In addition, since a plurality of conditions are combined to select a plurality of images to be used for spatial position estimation and the like, a three-dimensional position can be measured with high accuracy while the network load and the operation load are further reduced.

DESCRIPTION OF EMBODIMENTS

Hereinafter, embodiments of the present invention will be described with reference to the drawings.

First Embodiment

Hereinafter, a three-dimensional measurement apparatus of a first embodiment will be described with reference to FIGS. 1 to 12.

(Block Configuration)

Figure 1:
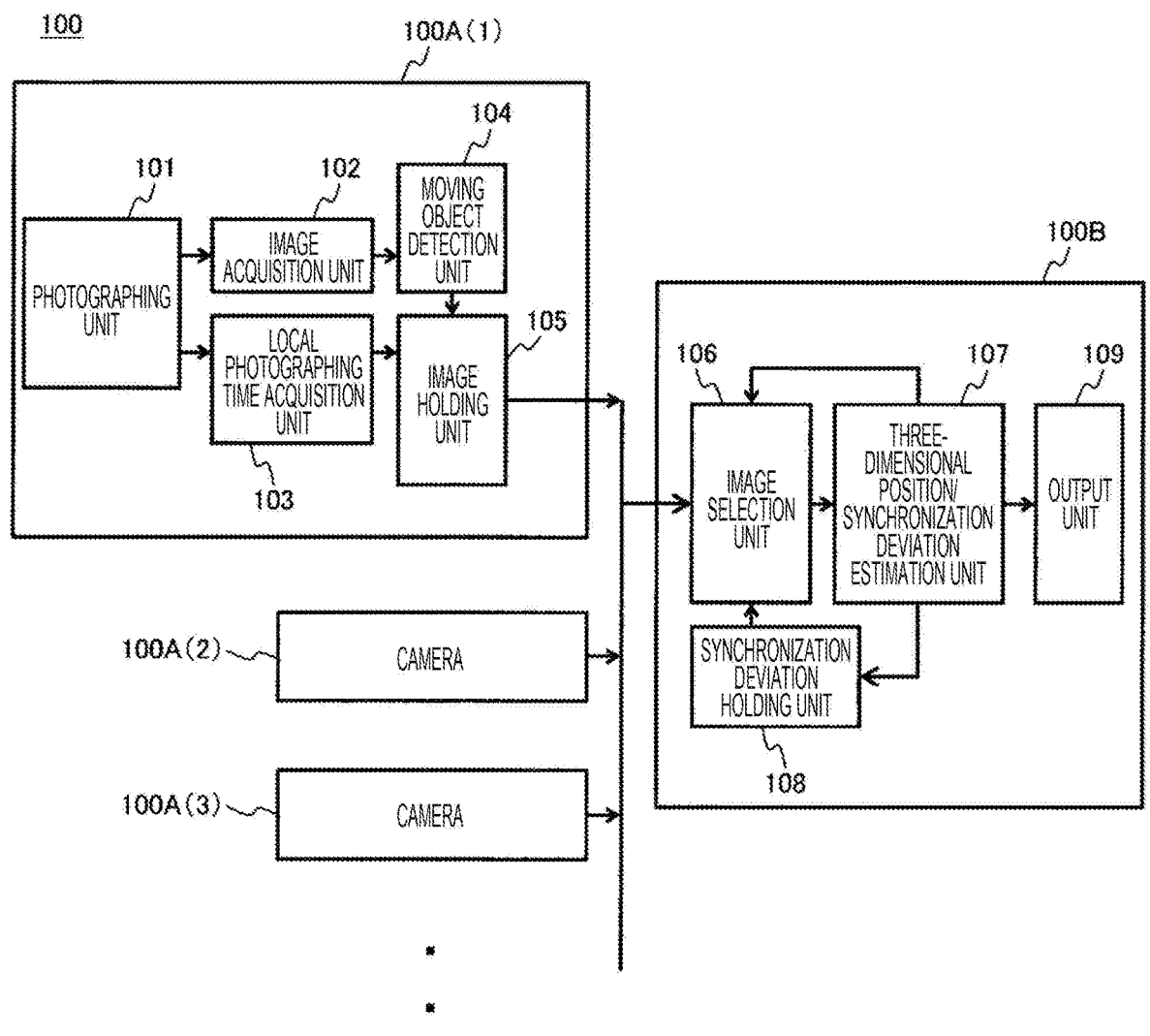
FIG. 1 is a block diagram showing a configuration of a three-dimensional measurement apparatus of a first embodiment.

FIG. 1 is a diagram showing a block configuration of a three-dimensional measurement apparatus 100 according to the first embodiment. The three-dimensional measurement apparatus 100 is to estimate a three-dimensional position and a size of a measurement target on the basis of a plurality of images, and as shown in FIG. 1, mainly configured by a plurality of cameras 100A and an arithmetic device 100B connected to them via a network.

The camera 100A includes a photographing unit 101, an image acquisition unit 102, a local photographing time acquisition unit 103, a moving object detection unit 104, and an image holding unit 105. Here, a detailed structure is shown with the camera 100A (1) as an example, and a detailed structure is omitted for the cameras 100A (2) and 100A (3) having the equivalent structure.

Further, the arithmetic device 100B includes an image selection unit 106, a three-dimensional position/synchronization deviation estimation unit 107, a synchronization deviation holding unit 108, and an output unit 109.

The camera 100A is, for example, a monitoring camera fixed to a ceiling and connected to a network, and photographs an image at a predetermined cycle by the photographing unit 101. The image acquisition unit 102 acquires an image photographed by the photographing unit 101. The local photographing time acquisition unit 103 acquires a photographing time of the image acquired by the image acquisition unit 102 at a local time of the camera 100A. Here, the local time is, for example, a time with which any time determined for each camera, such as an activation time of each camera, is set to 0. The moving object detection unit 104 detects a moving object from an image acquired by the image acquisition unit 102. The image holding unit 105 holds the image in which the moving object is detected, in association with a local photographing time at which the image is photographed.

Whereas, the arithmetic device 100B is a PC, a server, or the like connected to a network. From images held in the image holding unit 105, the image selection unit 106 selects and acquires one that satisfies a predetermined condition. Note that details of this condition will be described later. The three-dimensional position/synchronization deviation estimation unit 107 estimates a three-dimensional position of a moving object and a synchronization deviation between the cameras, from an image selected by the image selection unit 106 and the corresponding local photographing time. The synchronization deviation holding unit 108 holds a synchronization deviation between the plurality of cameras, which has been estimated by the three-dimensional position/synchronization deviation estimation unit 107. The output unit 109 outputs an estimation result of the three-dimensional position/synchronization deviation estimation unit 107.

In the following description, an identifier of the plurality of cameras 100A is k, and $N_k$ is the total number of cameras 100A. That is, the three-dimensional measurement apparatus 100 includes $N_k$ pieces of the camera 100A.

Figure 2:
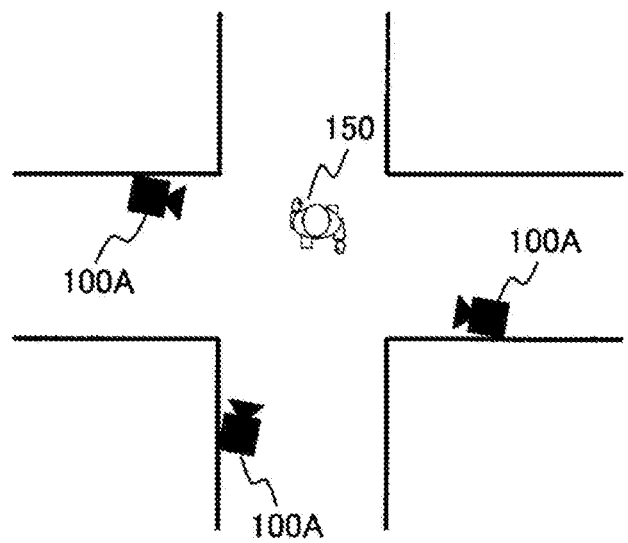
FIG. 2 is a schematic view showing an example of an installation environment of a camera.

FIG. 2 is a view showing an example of an installation environment of the camera 100A. Since each camera 100A has an area where a visual field is common to the other cameras 100A, the three-dimensional measurement apparatus 100 can measure a three-dimensional position and a size of a moving object 150 present in the visual field common area of the plurality of cameras 100A. Note that the moving object 150 is, for example, a pedestrian, a car, a robot, or the like to be observed.

Next, details of the inside of the camera will be described by using any given k-th camera 100A (k) as an example. The image acquisition unit 102 acquires an image from the photographing unit 101. In the following description, an identifier of the image acquired from the photographing unit 101 is i. Further, the local photographing time acquisition unit 103 acquires a local photographing time $l_{ki}$, which is a photographing time of each image acquired by the image acquisition unit 102.

Figure 3:
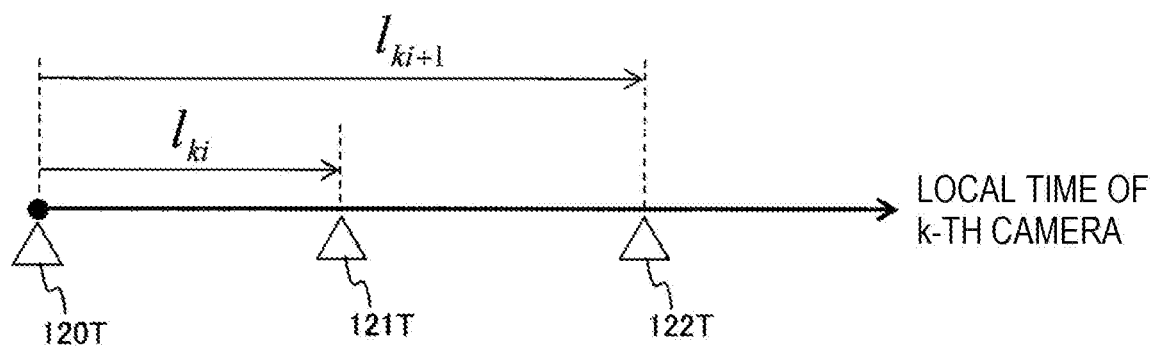
FIG. 3 is a view showing an example of a local photographing time of a specific camera.

FIG. 3 is a view showing an example of a local photographing time in the camera 100A (k). In this example, a photographing time of a first image of the camera 100A (k) is 120T, a photographing time of an i-th image is 121T, and a photographing time of an (i+1)-th image is 122T. Then, when the first photographing time 120T is defined as 0, which is a reference of the local time, a local photographing time corresponding to the photographing time 121T is to be $l_{ki}$, which is a difference between 121T and 120T, and a local photographing time corresponding to the photographing time 122T is to be $l_{ki+1}$, which is a difference between 122T and 120T. Note that each photographing time is a time when the camera 100A starts exposure or a time when the exposure is finished.

In a case where the local photographing time can be directly acquired from a timer included in the camera 100A (k), the local photographing time acquisition unit 103 acquires the local photographing time $l_{ki}$ or $l_{ki+1}$ from the timer. Whereas, in a case where there is no timer but a frame rate of the photographing unit 101 is constant and known, the local photographing time $l_{ki}$ or $l_{ki+1}$ is calculated using Equation 1 from a frame rate $\mu_k$ of the camera 100A (k).

[Formula 1]

$$l_{ki} = i/\mu_k \quad \text{(Equation 1)}$$

The moving object detection unit 104 determines whether the moving object 150 is included in the image acquired by the image acquisition unit 102. For the determination, for example, a known moving object detection technique such as a background subtraction method or a frame subtraction method can be used. The image holding unit 105 holds the image in which the moving object 150 is detected, in association with a local photographing time at which the image is photographed.

Whereas, the image selection unit 106 of the arithmetic device 100B selects and acquires an image satisfying a predetermined condition from images in which the moving object 150 is detected, which are held by the image holding unit 105 in the camera 100A (k). The three-dimensional position/synchronization deviation estimation unit 107 estimates a three-dimensional position of the moving object 150 and a synchronization deviation between the cameras 100A, from the image acquired by the image selection unit 106 and the corresponding local photographing time. The synchronization deviation holding unit 108 holds a synchronization deviation between the plurality of cameras 100A, which has been estimated by the three-dimensional position/synchronization deviation estimation unit 107. The output unit 109 outputs an estimation result of the three-dimensional position/synchronization deviation estimation unit 107. Details of processing in the arithmetic device 100B outlined here will be described later.

Figure 4:
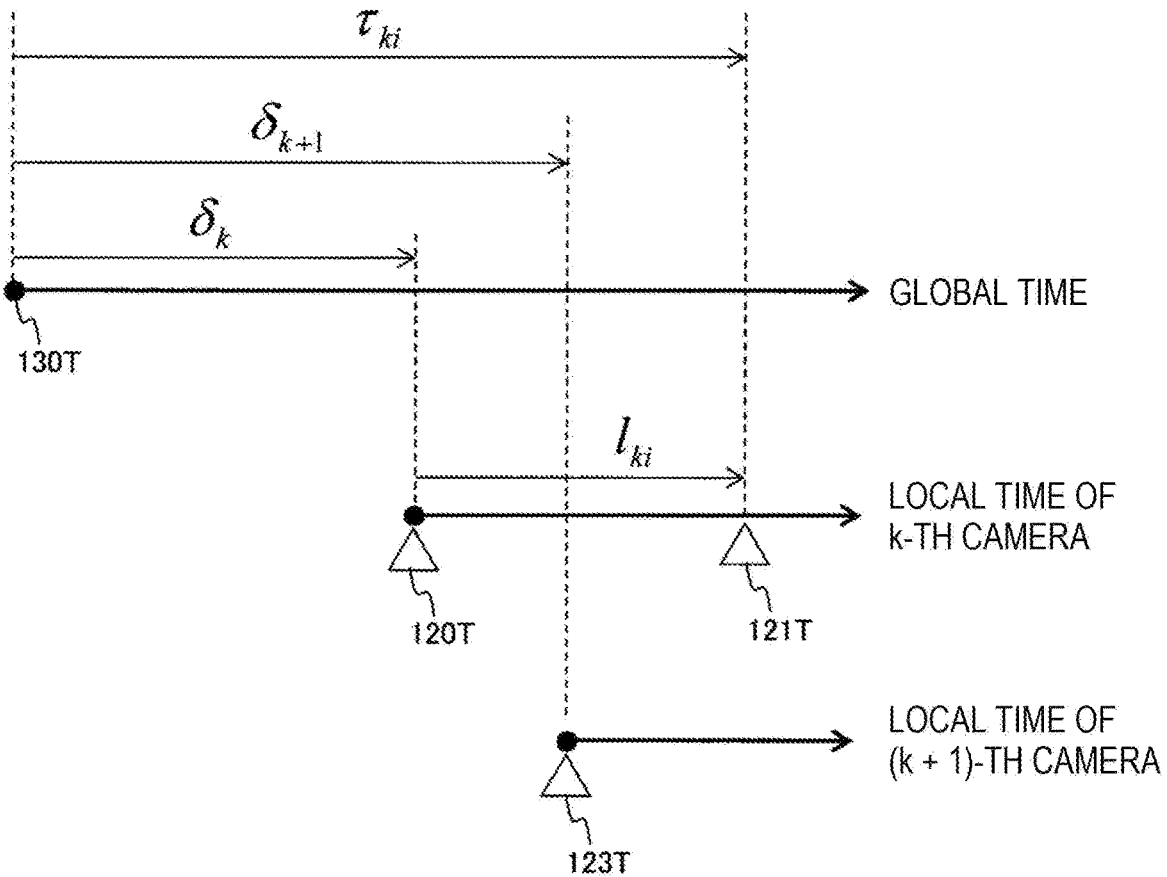
FIG. 4 is a view showing an example of a synchronization deviation between a plurality of cameras.

FIG. 4 is a view showing an example of a synchronization deviation between the plurality of cameras 100A. In the example shown here, similarly to FIG. 3, a photographing time of a first image of the camera 100A (k) is 120T, and a photographing time of an i-th photographed image is 121T. Further, a photographing time of a first image of a (k+1)-th camera 100A (k+1) is 123T.

Assuming that a difference between a global time based on any given time 130T and the local time of the camera 100A is a synchronization deviation δ, since the photographing times 120T and 123T of the first photographed image of each camera 100A are used as the reference of each local time in the example shown in FIG. 4, a synchronization deviation $δ_k$ of the camera 100A (k) can be calculated as a difference between the photographing time 120T and the time 130T, and a synchronization deviation $δ_{k+1}$ of the camera 100A (k+1) can be calculated as a difference between the photographing time 123T and the time 130T.

Further, a global photographing time $τ_{ki}$, which is a photographing time at the global time, of the i-th image photographed by the camera 100A (k) is calculated by Equation 2 from the synchronization deviation $δ_k$ and the local photographing time $l_{ki}$.

[Formula 2]

$$τ_{ki}=δ_k+l_{ki} \quad \text{(Equation 2)}$$

Note that FIG. 1 shows a configuration in which the photographing unit 101, the image acquisition unit 102, the local photographing time acquisition unit 103, the moving object detection unit 104, and the image holding unit 105 are provided in the camera 100A, while the image selection unit 106, the three-dimensional position/synchronization deviation estimation unit 107, the synchronization deviation holding unit 108, and the output unit 109 are provided in the arithmetic device 100B. However, to which each unit is to be provided is not limited to this configuration, and a configuration may be adopted in which, for example, only the photographing unit 101 is provided in the camera 100A, and the others are provided in the arithmetic device 100B. In this case, since it is necessary to transmit all the images photographed by the plurality of cameras 100A to the arithmetic device 100B, a load on the network is larger than in the former configuration. However, as described later, a spatial position and a size of an object can be estimated after the synchronization deviation between individual cameras that do not share photographing time information is estimated using the three-dimensional position/synchronization deviation estimation unit 107.

(Operation of Three-Dimensional Position/Synchronization Deviation Estimation Unit 107)

Next, contents of processing in the three-dimensional position/synchronization deviation estimation unit 107 will be described with reference to FIGS. 5 to 7. The processing performed by the three-dimensional position/synchronization deviation estimation unit 107 is three, that is, feature point matching, motion segmentation, and optimization.

In the feature point matching process, which is the first process, a same point on a measurement target is matched between the plurality of images selected and acquired by the image selection unit 106. A known matching method can be used for the matching of the same point. For example, a feature point that is a point to be easily matched is extracted from an image and used for the matching. In a case where a viewpoint change between images is small, it is possible to use the LK method (Bruce D. Lucas and Takeo Kanade, An Iterative Image Registration Technique with an Application to Stereo Vision, Int. Joint Conf. on Artificial Intelligence, pp. 674-679, 1981) that can achieve matching with a high speed and high accuracy when a viewpoint change is small. Further, in a case where a viewpoint change between images is large, SIFT (D. G. Lowe, Distinctive Image Features from Scale-Invariant Keypoints, Int. J. of Computer Vision, vol. 60, no. 2, pp. 91-110, 2004) can be used.

In the motion segmentation process, which is the next process, a plurality of feature point matchings obtained by the feature point association are divided into groups according to movement in the three-dimensional space, from a position of the feature point in the image. A known motion segmentation method can be used for dividing into groups according to movement in the three-dimensional space. For example, a method introduced in the document (R. Tron and R. Vidal, A Benchmark for the Comparison of 3-D Motion Segmentation Algorithms, Proc. IEEE Conf. On Computer Vision and Pattern Recognition, 8 pages, 2007) can be used.

In the optimization process, which is the final process, a three-dimensional position of the feature point and a synchronization deviation between the cameras 100A are estimated from a feature point matching result and a motion segmentation result. Specifically, by using a square sum E of a reprojection error as an objective function, and minimizing the square sum E of a reprojection error by using a known non-linear least-squares method such as the Levenberg-Marquardt method or the Gauss-Newton method, the three-dimensional position of the feature point and the synchronization deviation between the cameras 100A are estimated. The square sum E of a reprojection error is calculated by Equation 3.

[Formula 3]

$$E=E_p+E_l \quad \text{(Equation 3)}$$

Here, $E_p$ indicates a square sum of a reprojection error with respect to a detection position of a feature point, and $E_l$ indicates a square sum of a reprojection error with respect to an optical flow calculated from a detection position of a feature point. Hereinafter, the square sum $E_p$ of a reprojection error with respect to a detection position of a feature point is described first.

Figure 5:
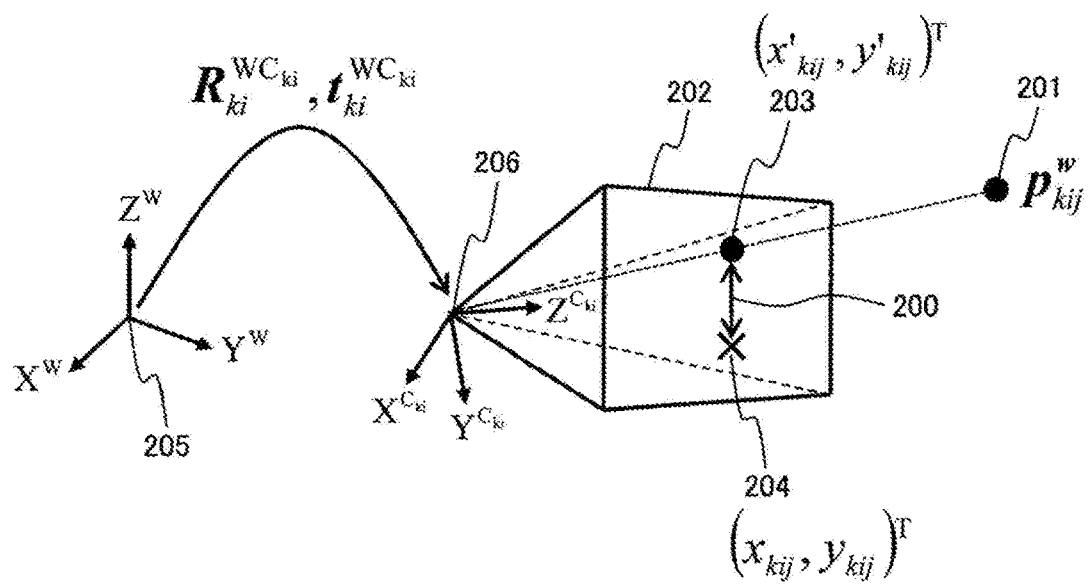
FIG. 5 is a view showing an example of a reprojection error with respect to a detection position of a feature point.

FIG. 5 is a view showing an example of a reprojection error with respect to a detection position of a feature point. A reprojection error 200 with respect to a detection position of a feature point is a distance of detection position 204 of the actual feature point in the same image 202, between with a projection position 203 in which a three-dimensional position 201 of a predicted feature point is projected onto the image 202 with use of camera extrinsic parameters representing a position and an orientation of the camera 100A, and camera intrinsic parameters such as a focal distance, an optical center position, and lens distortion. The position and the orientation of the camera 100A are expressed by a rotation matrix and a translation vector from world coordinates 205 to camera coordinates 206. Here, the world coordinates 205 are orthogonal coordinates whose origin is an any given position in a three-dimensional space, and the camera coordinates 206 are orthogonal coordinates whose origin is an optical center of the camera 100A, and in which an x-axis direction is taken along an x axis of the image 202, a y axis is taken along a y-axis direction of the image 202, and a z axis is taken along an optical axis of the camera 100A.

The square sum $E_p$ of the reprojection error 200 with respect to the detection position of the feature point is calculated by Equation 4.

[Formula 4]

$$E_p = \sum_{k \in K} \sum_{i \in I_k} \sum_{j \in P_{ki}} |(x_{kij}, y_{kij})^T - (x'_{kij}, y'_{kij})^T|^2 \quad \text{(Equation 4)}$$

Here, K is a collection of the cameras 100A for which image selection unit 106 has selected one or more images, $I_k$ is a collection of images 202 photographed by the camera 100A (k) and selected by the image selection unit 106, and $P_{ki}$ is a collection of feature points matched with the i-th image 202 photographed by the camera 100A (k). $(x_{kij}, y_{kij})^T$ is a detection position 204 of a j-th feature point in an i-th image 202 photographed by the camera 100A (k) in normalized image coordinates. $(x'_{kij}, y'_{kij})^T$ is the projection position 203 where the three-dimensional position 201 of the j-th feature point in the i-th image 202 photographed by the camera 100A (k) in the world coordinates 205 is projected onto the i-th image 202 photographed by the camera 100A (k).

For example, when a perspective projection model is used as a camera model, the detection position 204 $(x_{kij}, y_{kij})^T$ of the j-th feature point in the i-th image 202 photographed by the camera 100A (k) in the normalized image coordinates is calculated by Equation 5. However, the camera model is not limited to the perspective projection model, and other camera model such as a camera model for an omnidirectional camera may be used.

[Formula 5]

$$(x_{kij}, y_{kij})^T = \left(\frac{u_{kij} - c_{kx}}{f_{kx}}, \frac{v_{kij} - c_{ky}}{f_{ky}}\right)^T \quad \text{(Equation 5)}$$

Here, $(c_{kx}, c_{ky})^T$ is a position of the optical center of the camera 100A (k), and $(f_{kx}, f_{ky})^T$ is a focal length of the camera 100A (k). $(u_{kij}, v_{kij})^T$ is the detection position 204 of the j-th feature point in the i-th image 202 photographed by the camera 100A (k) in the image coordinates from which lens distortion is removed, and is calculated by Equations 6.1 and 6.2, for example, when distortion aberration in a radial direction of a lens is used as a lens distortion model. However, the lens distortion model is not limited to distortion aberration in the radial direction of the lens, and other lens model such as distortion aberration in a tangential direction orthogonal to the radial direction of the lens may be used.

[Formula 6]

$$(u_{kij}, v_{kij})^T = ((1+\kappa_1 r^2 + \kappa_2 r^4)(u'_{kij} - c_{kx}), (1+\kappa_1 r^2 + \kappa_2 r^4)(v'_{kij} - c_{ky})) \quad \text{(Equation 6.1)}$$

$$r^2 = (u'_{kij} - c_{kx})^2 + (v'_{kij} - c_{ky})^2 \quad \text{(Equation 6.2)}$$

Here, $(u'_{kij}, v'_{kij})^T$ is the detection position 204 of the j-th feature point in the i-th image 202 photographed by the camera 100A (k) determined by the feature point detection process. $\kappa_1$ and $\kappa_2$ are lens distortion parameters. The camera intrinsic parameters such as the position $(c_{kx}, c_{ky})^T$ of the optical center of each camera 100A, the focal length $(f_{kx}, f_{ky})^T$, and the lens distortion parameters $\kappa_1$ and $\kappa_2$ are made known by prior camera calibration.

Projection coordinates 203 $(x'_{kij}, y'_{kij})^T$ in which the three-dimensional position 201 of the j-th feature point in the i-th image 202 photographed by the camera 100A (k) in the world coordinates 205 is projected onto the i-th image 202 photographed by the camera 100A (k) is calculated by Equations 7.1 and 7.2.

[Formula 7]

$$(x'_{kij}, y'_{kij})^T = \left(\frac{X_{kij}^{C_{ki}}}{Z_{kij}^{C_{ki}}}, \frac{Y_{kij}^{C_{ki}}}{Z_{kij}^{C_{ki}}}\right)^T \quad \text{(Equation 7.1)}$$

$$(X_{kij}^{C_{ki}}, Y_{kij}^{C_{ki}}, Z_{kij}^{C_{ki}})^T = R_{ki}^{WC_{ki}} p_{kij}^W + t_{ki}^{WC_{ki}} \quad \text{(Equation 7.2)}$$

Here, $R_{ki}^{WC_{ki}}$ and $t_{ki}^{WC_{ki}}$ are a rotation matrix and a translation vector of the i-th image 202 photographed by the camera 100A (k) from the world coordinates 205 to the camera coordinates 206. The camera extrinsic parameters such as the rotation matrix and the translation vectors $R_{ki}^{WC_{ki}}$ and $t_{ki}^{WC_{ki}}$ are made known by prior camera calibration. $p_{kij}^W$ is the three-dimensional position 201 of the j-th feature point at the global photographing time $\tau_{ki}$ of the i-th image 202 photographed by the camera 100A (k) in the world coordinates 205.

Here, when the three-dimensional position 201 $p_{kij}^W$ of the feature point at the global photographing time $\tau_{ki}$ is not restricted, there are innumerable pieces of $p_{kij}^W$ causing the square sum $E_p$ of the reprojection error 200 with respect to the detection position of the feature point shown in Equation 4 to be zero. That is, the three-dimensional position 201 $p_{kij}^W$ of the feature point at the global photographing time $\tau_{ki}$ cannot be uniquely determined. Therefore, motion of the three-dimensional position 201 $p_{kij}$ of the feature point is restricted, for example, to be according to a motion model such as uniform linear motion or uniform acceleration motion. In addition, as a result of the motion segmentation process, feature points belonging to a same group may additionally be restricted to move with a parameter of a same motion model.

Figure 6:
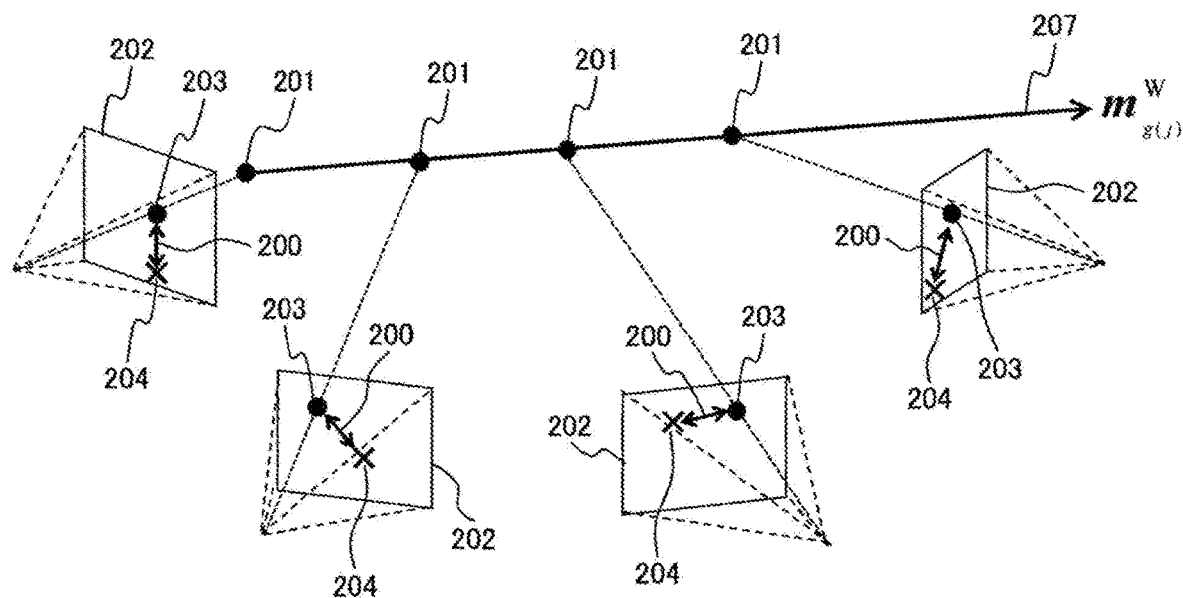
FIG. 6 is a view showing an example of motion of a three-dimensional position of a feature point.
Figure 7:
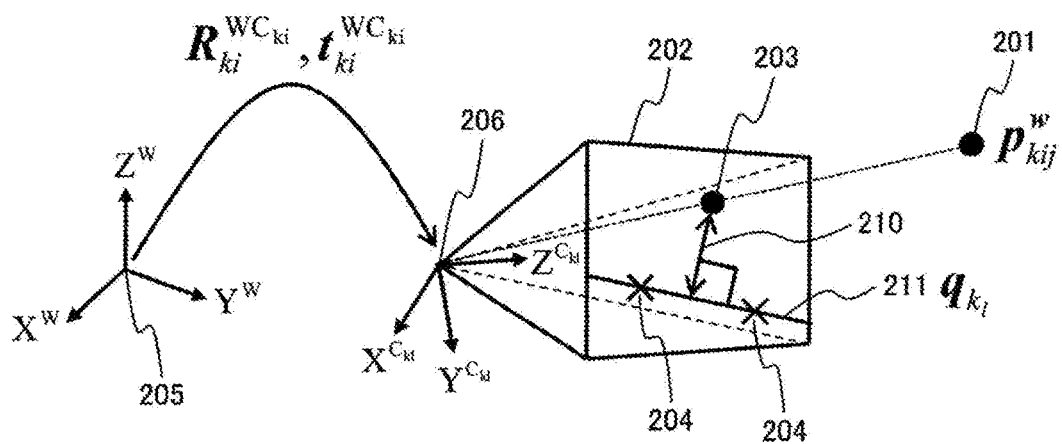
FIG. 7 is a view showing an example of a reprojection error with respect to an optical flow.

FIG. 6 is a view showing an example of motion of a three-dimensional position 201 of a feature point. In the example shown in FIG. 6, the three-dimensional position 201 of the feature point is in motion by the uniform linear motion 207. When uniform linear motion is used as the motion model, the three-dimensional position 201 $p_{kij}^W$ of the feature point at the global photographing time $\tau_{ki}$ is calculated by Equation 8.

[Formula 8]

$$p_{kij}^W = p_j^W + m_{g(j)}^W \tau_{ki} \quad \text{(Equation 8)}$$

Here, $p_j^W$ is the three-dimensional position 201 of the j-th feature point at the global time 0 in the world coordinates 205, and $m_{g(j)}^W$ is a velocity in the world coordinates 205 of a group to which the j-th feature point belongs.

Next, a square sum $E_l$ of a reprojection error with respect to an optical flow calculated from a detection position of a feature point will be described. FIG. 7 is a view showing an example of a reprojection error with respect to the optical flow. A reprojection error 210 with respect to the optical flow is a distance between the projection position 203 where the three-dimensional position 201 of the feature point is projected onto the image 202, and a straight line 211 corresponding to the optical flow calculated from the detection position 204 of the feature point.

The square sum $E_l$ of the reprojection error 210 with respect to the optical flow calculated from the detection position of the feature point is calculated by Equation 9.

[Formula 9]

$$E_1 = \sum_{j \in P} \sum_{k \in K} \sum_{i \in I_k} \sum_{k_l \in K_2-k} e\left(q_{k_l}, proj\left(p_{kij}^W, R_{k_l}^{WC_{k_l}}, t_{k_l}^{WC_{k_l}}\right)\right)^2 \quad \text{(Equation 9)}$$

Here, P is a collection of all feature points, $K_2$ is a collection of the cameras 100A whose positions and orientations do not change and for which two or more images are selected by the image selection unit 106. $q_{kl}$ is the straight line 211 corresponding to the optical flow calculated from the detection position 204 of the feature point. $q_{kl}$ is calculated by applying a straight line to the detection positions 204 of feature points of all selected images for each camera 100A. proj ($p_{kij}^W$, $R_{kl}^{WCkl}$, $t_{kl}^{WCkl}$) is a function that returns, with the calculation similar to Equation 7, a projection position where the three-dimensional position $p_{kij}$ of the j-th feature point at the time when the i-th image is photographed by the camera 100A (k) is projected onto an image photographed by the camera 100A ($k_1$), by using the position and the orientation $R_{kl}^{WCkl}$ and $t_{kl}^{WCkl}$ of the $k_l$-th camera 100A ($k_1$). e is a function that returns a distance between a straight line and a point.

As shown in Equation 10, by minimizing the square sum E of the reprojection error, the three-dimensional position/synchronization deviation estimation unit 107 estimates a three-dimensional position 201 $p_j^W$ of the feature point, a motion $m_{g(j)}^W$ of the feature point, and the synchronization deviation $\delta_k$ between the cameras.

[Formula 10]

$$\underset{\{p_j^W\}_{j \in P}, \{m_g^W\}_{g \in G}, \{\delta_k\}_{k \in K-k'}}{\arg\min} E \quad \text{(Equation 10)}$$

Here, G is a collection of all the groups obtained by the motion segmentation process. k' is one camera 100A as a reference of any determined time among the cameras 100A for which one or more images 202 are selected by the image selection unit 106.

(Creation of Common Field of View Graph)

Figure 8:
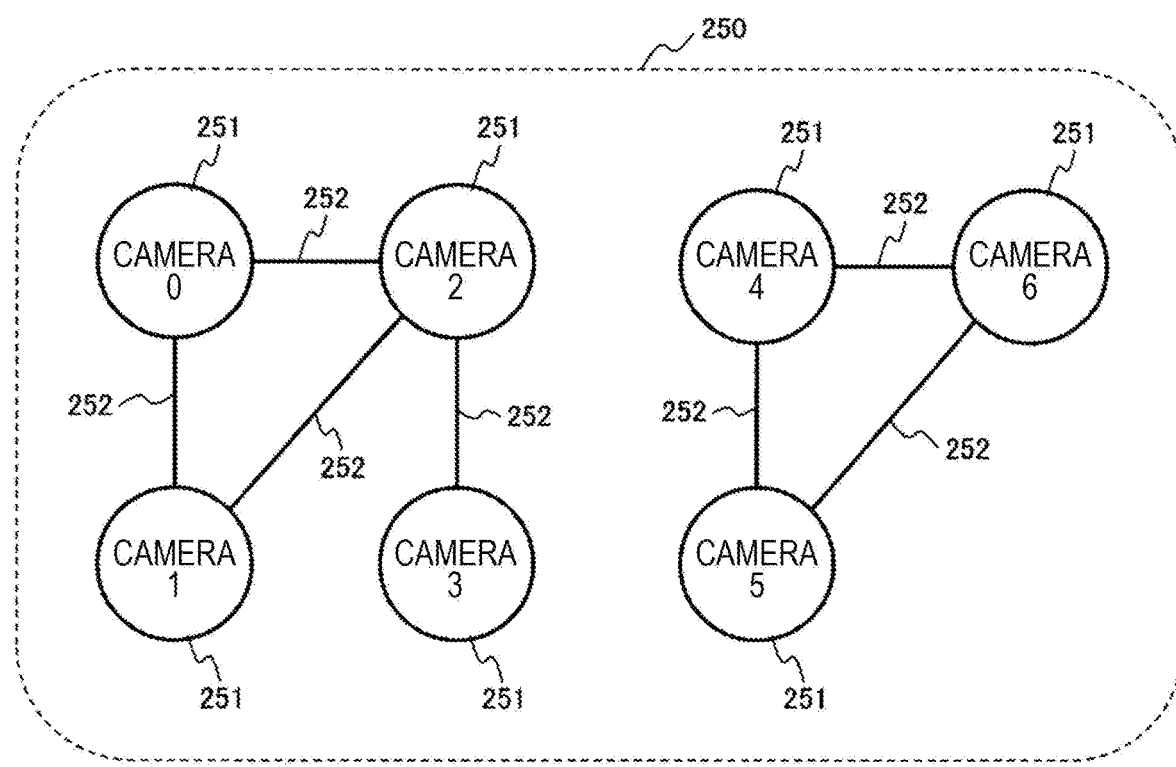
FIG. 8 is a view showing an example of a common field of view graph.

In the three-dimensional measurement apparatus 100, prior to actual operation, a common field of view graph 250 representing a relationship of a common field of view between the cameras 100A is created from a position and an orientation of each camera 100A and intrinsic parameters, to be able to be utilized by the image selection unit 106 at the time of actual operation. FIG. 8 is an example of the common field of view graph 250.

As shown here, the common field of view graph 250 is formed of a node 251 and an edge 252. The node 251 represents the camera 100A of the corresponding camera number, and the edge 252 represents that the cameras 100A corresponding to the nodes 251 at both ends have a common field of view. Therefore, taking camera 0 as an example, it is shown that there is a common field of view with camera 1 and camera 2 and no common field of view with other cameras.

Figure 9:
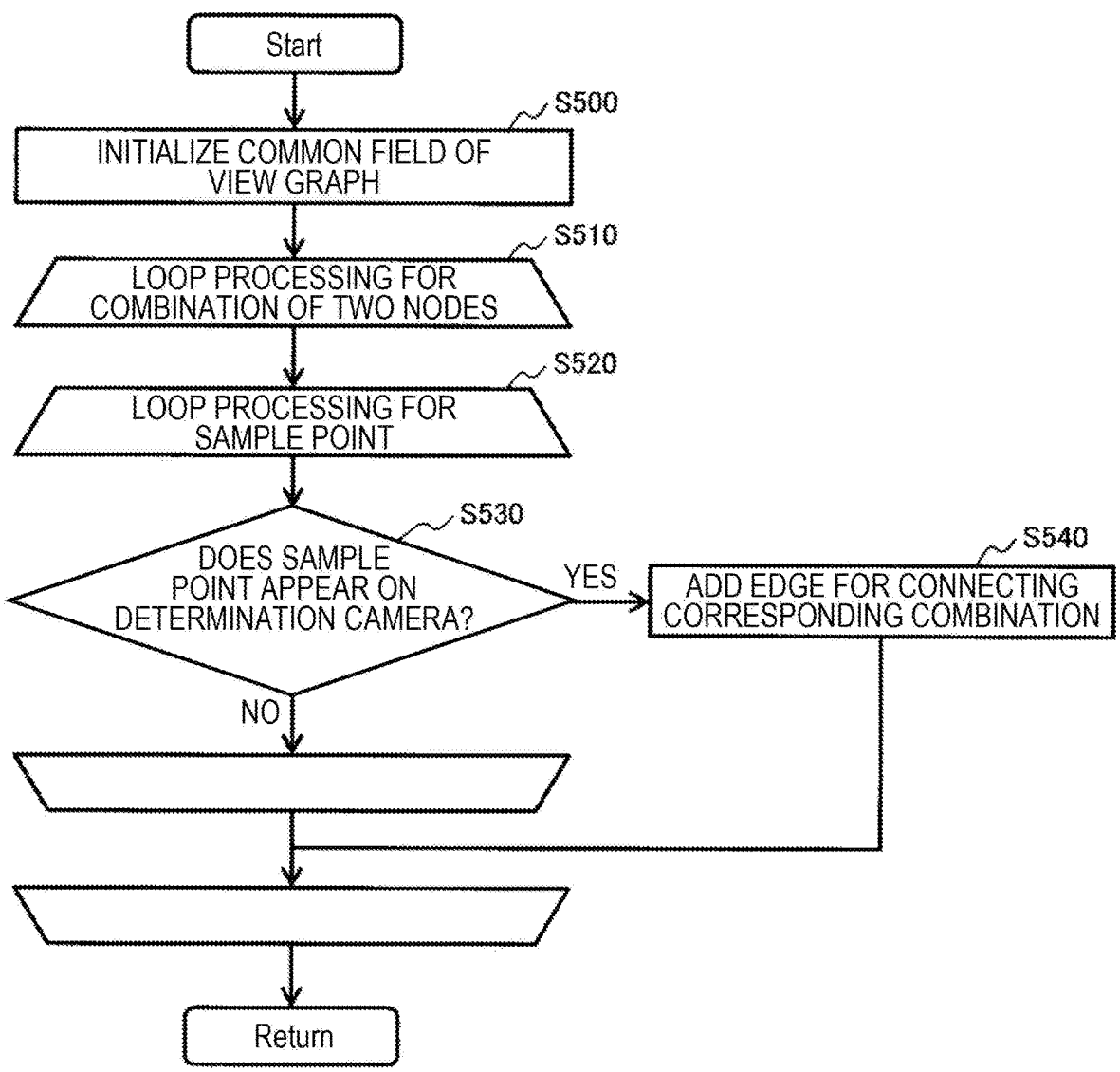
FIG. 9 is a flowchart of processing to create the common field of view graph.

FIG. 9 is a flowchart of processing to create the common field of view graph 250.

In the first step S500, the common field of view graph 250 is initialized. Specifically, a graph is created that consists only of the node 251 corresponding to each camera 100A and does not have the edge 252.

In step S510, loop processing of selecting two nodes 251 from $N_k$ pieces of the node 251 for $_{Nk}C_2$ pieces of combination is started. Hereinafter, among cameras corresponding to two nodes, any one camera is defined as a reference camera, and the other camera is defined as a determination camera. Further, a camera number of the reference camera is $k_a$, and a camera number of the determination camera is $k_b$.

In step S520, loop processing is started on a sample point, which is utilized to determine whether the two cameras have a common field of view, in three-dimensional space. The sample point is created on the basis of the reference camera. For example, the sample point is obtained by sampling a three-dimensional space defined by: a minimum value $x_{kamin}$ and a maximum value $x_{kamax}$ of an image x coordinate in the normalized image coordinates of the reference camera; a minimum value $y_{kamin}$ and a maximum value $y_{kamax}$ of an image y coordinate in the normalized image coordinates of the reference camera; and a minimum value $Z_{kamin}$ and a maximum value $Z_{kamax}$ of a depth in the camera coordinates 206 of the reference camera, at step widths $x_{step}$, $y_{step}$, and $Z_{step}$, respectively. $x_{kamin}$, $x_{kamax}$, $y_{kamin}$, and $y_{kamax}$ are determined from an image size of the reference camera. $Z_{kamin}$, $Z_{kamax}$, $x_{step}$, $y_{step}$, and $Z_{step}$ are optionally set in advance. In the following, the image x coordinate in the normalized image coordinates of the reference camera of the sample point is $x_{kas}$, the image y coordinate in the normalized image coordinates of the reference camera is $y_{kas}$, and a depth in the camera coordinates of the reference camera is $Z_{kas}$.

In step S530, it is determined whether a sample point appears on the determination camera. First, a three-dimensional position $p_s^{Ckb}$ of the sample point in the camera coordinates 206 of the determination camera is calculated by Equations 11.1 to 11.3.

[Formula 11]

$$p_s^{C_{k_b}} = R_{k_b}^{WC_{k_b}} p_s^W + t_{k_b}^{WC_{k_b}} \quad \text{(Equation 11.1)}$$

$$p_s^W = \left(R_{k_a}^{C_{k_a}W} p_s^{C_{k_a}} + t_{k_a}^{C_{k_a}W}\right) \quad \text{(Equation 11.2)}$$

$$p_s^{C_{k_a}} = (x_{k_as}, y_{k_as}, 1)^T Z_{k_as} \quad \text{(Equation 11.3)}$$

Here, $R_{ka}^{CkaW}$ and $t_{ka}^{CkaW}$ are a rotation matrix and a translation vector from the camera coordinates 206 of the reference camera to the world coordinates 205, and $R_{kb}^{WCkb}$ and $t_{kb}^{WCkb}$ are a rotation matrix and a translation vector from the world coordinates 205 to the camera coordinates 206 of the determination camera. Next, in the normalized image coordinates of the determination camera, the projection position $(x'_{k_b s}, y'_{k_b s})^T$ of the three-dimensional position $p_s^{C_{k_b}}$ of the sample point in the camera coordinates 206 of the determination camera is calculated by Equations 12.1 and 12.2.

[Formula 12]

$$(x'_{k_b s}, y'_{k_b s})^T = \left( \frac{X_{k_b s}^{C_{k_b}}}{Z_{k_b s}^{C_{k_b}}}, \frac{Y_{k_b s}^{C_{k_b}}}{Z_{k_b s}^{C_{k_b}}} \right)^T \quad \text{(Equation 12.1)}$$

$$\left( X_{k_b s}^{C_{k_b}}, Y_{k_b s}^{C_{k_b}}, Z_{k_b s}^{C_{k_b}} \right)^T = p_s^{C_{k_b}} \quad \text{(Equation 12.2)}$$

Finally, a determination formula of Equation 13 is calculated.

[Formula 13]

$$x_{k_b min} < x'_{k_b s} < x_{k_b max} \quad \text{(Equation 13.1)}$$

$$y_{k_b min} < y'_{k_b s} < y_{k_b max} \quad \text{(Equation 13.2)}$$

$$Z_{k_b min} < Z_{k_b s}^{C_{k_b}} < Z_{k_b max} \quad \text{(Equation 13.3)}$$

Here, $x_{k_b min}$ and $x_{k_b max}$ are the minimum and maximum values of the image x coordinate in the normalized image coordinates of the determination camera, $y_{k_b min}$ and $y_{k_b max}$ are the minimum and maximum values of the image y coordinate in the normalized image coordinates of the determination camera, and $Z_{k_b min}$ and $Z_{k_b max}$ are the minimum and maximum values of a depth in the camera coordinates 206 of the determination camera. $x_{k_b min}$, $x_{k_b max}$, $y_{k_b min}$, and $y_{k_b max}$ are determined from an image size of the determination camera. $Z_{k_b min}$ and $Z_{k_b max}$ are optionally set in advance. When all the determination formulas of Equations 13.1 to 13.3 are satisfied, it is determined that the sample point appears on the determination camera, that is, it is determined that the two cameras have a common field of view, and the process proceeds to step S540. If even one determination formula is not satisfied, the process proceeds to the loop processing of the next sample point.

In step S540, the edge 252 for connecting between the nodes 251 corresponding to the reference camera and the determination camera in the common field of view graph 250 is added. The common field of view graph 250 can be completed by the series of processes up to this point.

(Operation of Image Selection Unit 106)

Figure 10:
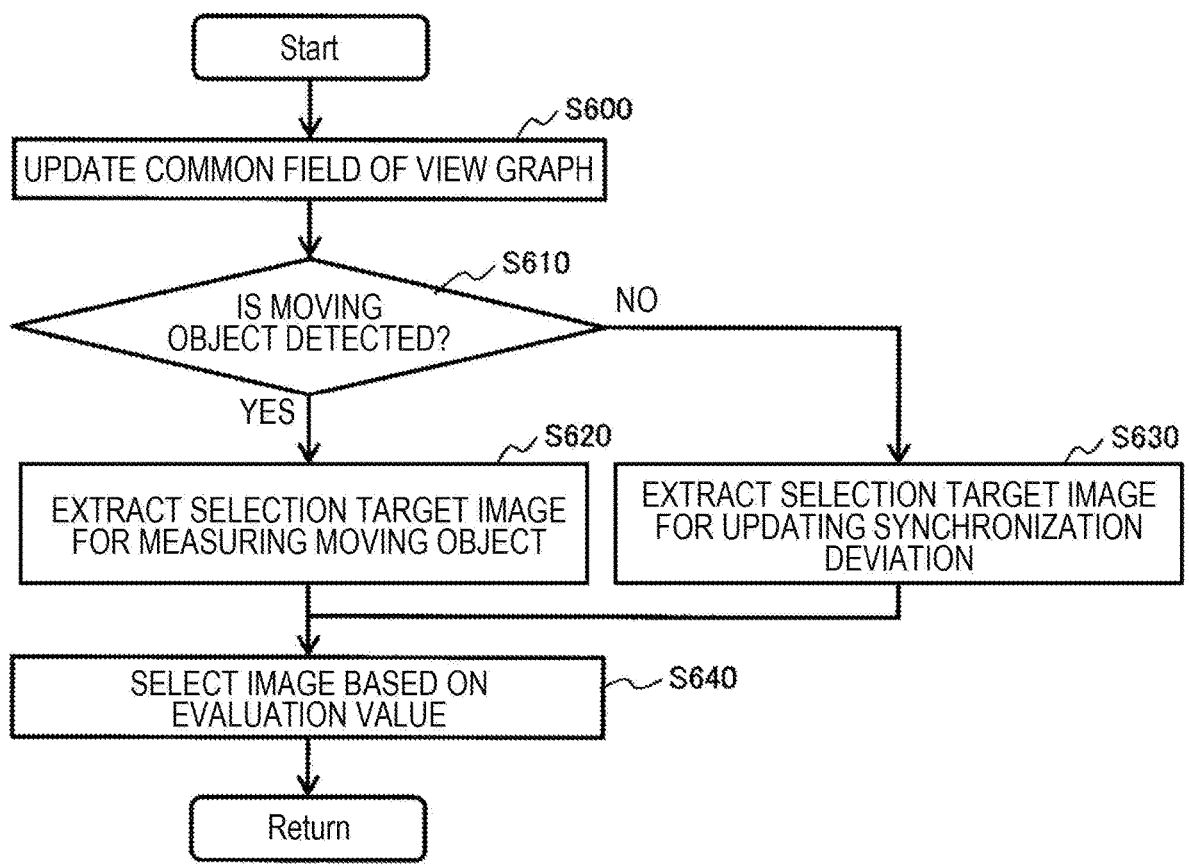
FIG. 10 is a flowchart showing processing of an image selection unit.

Next, contents of processing in the image selection unit 106 will be described with reference to FIGS. 10 and 11. FIG. 10 is a flowchart showing processing executed by the image selection unit 106. In step S600, the common field of view graph 250 is updated as necessary. In step S610, it is determined whether the moving object 150 is currently detected. When the moving object 150 is detected, the process proceeds to step S620, and when the moving object 150 is not detected, the process proceeds to step S630. In step S620, a selection target image for measuring the moving object 150 is extracted. In step S630, a selection target image for updating a synchronization deviation of the camera 100A is extracted. In step S640, an image is selected from the selection target images on the basis of an evaluation value. Each step will be described in detail below.

In the first step S600, the common field of view graph 250 is updated on the basis of a processing result of the three-dimensional position/synchronization deviation estimation unit 107 up to the previous processing cycle. Specifically, first, in the three-dimensional position/synchronization deviation estimation unit 107, extraction is performed on a combination of the cameras 100A for which matching of feature points is calculated more than a preset number of times. Next, for the extracted combination, an average of the number of feature points matched by each feature point matching process is calculated. Finally, when the average of the number of feature points is equal to or less than a preset threshold, it is determined that the association of feature points cannot be obtained from the combination, and the edge 252 connecting between the nodes 251 corresponding to the applicable cameras 100A is removed from the common field of view graph 250.

In step S610, it is determined whether each camera 100A currently detects the moving object 150. Specifically, when the image holding unit 105 is updated within a preset time, it is determined that the moving object 150 is detected, and the process proceeds to step S620. When the image holding unit 105 has not been updated for a preset time or more, it is determined that the moving object 150 is not detected, and the process proceeds to step S630.

In step S620, the image 202 of the selection target for measuring the moving object 150 is extracted as the selection target image. Specifically, first, the image 202 newly added to the image holding unit 105 within a preset time is extracted as the selection target image. Next, the oldest global photographing time corresponding to the extracted image is calculated from the local photographing time held in the image holding unit 105 and the synchronization deviation held in the synchronization deviation holding unit 108. Finally, from the image holding unit 105, the image 202 photographed within $\tau_{th}$ from the oldest global photographing time is additionally extracted as the selection target image. $\tau_{th}$ is a preset threshold.

In step S630, the image 202 of the selection target for updating a synchronization deviation is extracted as the selection target image. Specifically, from the local photographing time held in the image holding unit 105 and the synchronization deviation held in the synchronization deviation holding unit 108, the global photographing time of the image held in the image holding unit 105 is calculated, and the image 202 photographed within $\tau'_{th}$ from the most recent global photographing time is extracted as the selection target image. $\tau'_{th}$ is a preset threshold. Here, in step S630, by setting $\tau'_{th}$ to be larger than $\tau_{th}$, more images than those in step S620 of extracting the selection target image for measuring the moving object are extracted as the selection target image.

In step S640, an image is selected from the selection target images on the basis of an evaluation value. FIG. 11 is a flowchart showing details of processing executed in step S640.

First, in step S641, the common field of view graph 250 is updated on the basis of the selection target image. Specifically, the node 251 corresponding to the camera 100A for which no photographed image is included in the selection target image, and the edge 252 connected to this node 251 are excluded from the common field of view graph 250.

In step S642, the common field of view graph 250 is subjected to connected component decomposition, and the loop processing (steps S643 to S647) on each connected component is started. For the connected component decomposition of the common field of view graph 250, known techniques with breadth-first search, depth-first search, and the like can be used. For example, the common field of view graph 250 shown in FIG. 8 is decomposed into two connected components. One is a connected component consisting of the nodes 251 corresponding to the 0th, 1st, 2nd, and 3rd cameras and the edges 252 connecting them, and the other is a connected component consisting of the nodes 251 corresponding to the 4th, 5th, and 6th cameras and the edges 252 connecting them.

In step S643, a combination of images is selected as a selection candidate image from selection target images photographed by the camera 100A included in the connected component to be processed, and the loop processing (steps S644 to S646) for each combination is started. In the following, the number of selection candidate images photographed by the camera 100A included in the connected component to be processed is defined as Ncimg. Further, the number of cameras 100A included in the connected component to be processed is defined as Nccam. Specifically, in step S643, Ns pieces of image are selected from the Ncimg pieces of image. First, among the images photographed by each camera 100A, the image 202 having the latest local photographing time is selected. That is, Nccam pieces of the image 202 are selected. Next, $_{(Ncimg-Nccam)}C_{(Ns-Nccam)}$ pieces of combination of images 202, in which (Ns−Nccam) pieces of image are selected from the remaining (Ncimg−Nccam) pieces of image, are generated, and loop processing for each combination is started. An image included in each combination is to be a selection candidate image.

In step S644, a space evaluation value $V_s$ for the selection candidate image is calculated by Equations 14.1 to 14.3.

similar to Equations 12 and 13. $(k_\alpha, i_\alpha)$ and $(k_\beta, i_\beta)$ are camera numbers and image numbers of two images 202 selected from the collection. $t_{k\alpha i\alpha}^{C_{k\alpha i\alpha}W}$ and $t_{k\beta i\beta}^{C_{k\beta i\beta}W}$ respectively are a position in the world coordinates 205 of an $i_\alpha$-th image 202 photographed by the $k_\alpha$-th camera 100A ($k_\alpha$), and a position in the world coordinates 205 of an $i_\beta$-th image 202 photographed by the $k_\beta$-th camera 100A ($k_\beta$). $\angle(t_{k\alpha i\alpha}^{C_{k\alpha i\alpha}W}, p_g^W, t_{k\beta i\beta}^{C_{k\beta i\beta}W})$ is an angle formed by three points of $t_{k\alpha i\alpha}^{C_{k\alpha i\alpha}W}$, $p_g^W$, and $t_{k\beta i\beta}^{C_{k\beta i\beta}W}$, with $p_g^W$ as the center. $\lambda_d$ and $\lambda_a$ are preset weights.

In step S645, a time evaluation value $V_t$ for the selection candidate image is calculated by Equation 15.

[Formula 15]

$$V_t = \frac{1}{\sigma_\tau} \quad \text{(Equation 15)}$$

Here, $\sigma_\tau$ is standard deviation of the global photographing time of the selection candidate image.

In step S646, an evaluation value V is calculated by Equation 16 from the space evaluation value $V_s$ and the time evaluation value $V_t$ for the selection candidate image.

[Formula 16]

$$V = \lambda_s V_s + \lambda_t V_t \quad \text{(Equation 16)}$$

Here, $\lambda_s$ and $\lambda_t$ are preset weights.

In step S647, a combination with the largest evaluation value V is selected as an input of the three-dimensional

[Formula 14]

$$V_s = \lambda_d \sum_{(k_\alpha, i_\alpha),(k_\beta, i_\beta) \in C_2} d((k_\alpha, i_\alpha), (k_\beta, i_\beta)) + \lambda_a \sum_{g \in G} \sum_{(k_\alpha, i_\alpha),(k_\beta, i_\beta) \in C_{2g}} a((k_\alpha, i_\alpha), (k_\beta, i_\beta)) \quad \text{(Equation 14.1)}$$

$$d((k_\alpha, i_\alpha), (k_\beta, i_\beta)) = \begin{cases} \left| t_{k_\alpha i_\alpha}^{C_{k_\alpha i_\alpha}W} - t_{k_\beta i_\beta}^{C_{k_\beta i_\beta}W} \right| & \text{if } k\alpha\text{-th camera and } k\beta\text{-th camera in common field of view graph} \\ 0 & \text{Other} \end{cases} \quad \text{(Equation 14.2)}$$

$$a((k_\alpha, i_\alpha), (k_\beta, i_\beta)) = \begin{cases} \angle\left(t_{k_\alpha i_\alpha}^{C_{k_\alpha i_\alpha}W}, p_g^W, t_{k_\beta i_\beta}^{C_{k_\beta i_\beta}W}\right) & \text{if } k\alpha\text{-th camera and } k\beta\text{-th camera in common field of view graph} \\ 0 & \text{Other} \end{cases} \quad \text{(Equation 14.3)}$$

Here, $C_2$ is a collection of all combinations of selecting two images from the selection candidate image. G is a collection of all the groups obtained by the motion segmentation process of the three-dimensional position/synchronization deviation estimation unit 107 in the previous processing cycle. $p_g^W$ is an average of the three-dimensional positions of feature points in the group estimated by the three-dimensional position/synchronization deviation estimation unit 107 in the previous processing cycle, and represents the three-dimensional position of the moving object corresponding to the group. $C_{2g}$ is a collection of all combinations of selecting two images in which the projection position of $p_g^W$ is within a range of the image, and a depth from the camera to $p_g^W$ is within a preset value, among the selection candidate images determined by processing position/synchronization deviation estimation unit 107, from all the combinations of selection candidate images.

The image selection based on the evaluation value in step S640 can be realized by the processing in steps S641 to S647 for each connected component and each combination of images described above.

(Operation of Output Unit 109)

Next, an operation of the output unit 109 will be described with reference to FIG. 12. The output unit 109 outputs a three-dimensional position 201 of a feature point estimated by the three-dimensional position/synchronization deviation estimation unit 107, to an external device such as a management server. Further, the output unit 109 may also display the three-dimensional position 201 of the feature point estimated by the three-dimensional position/synchronization deviation estimation unit 107, by using a three-dimensional or two-dimensional map.

Figure 12:
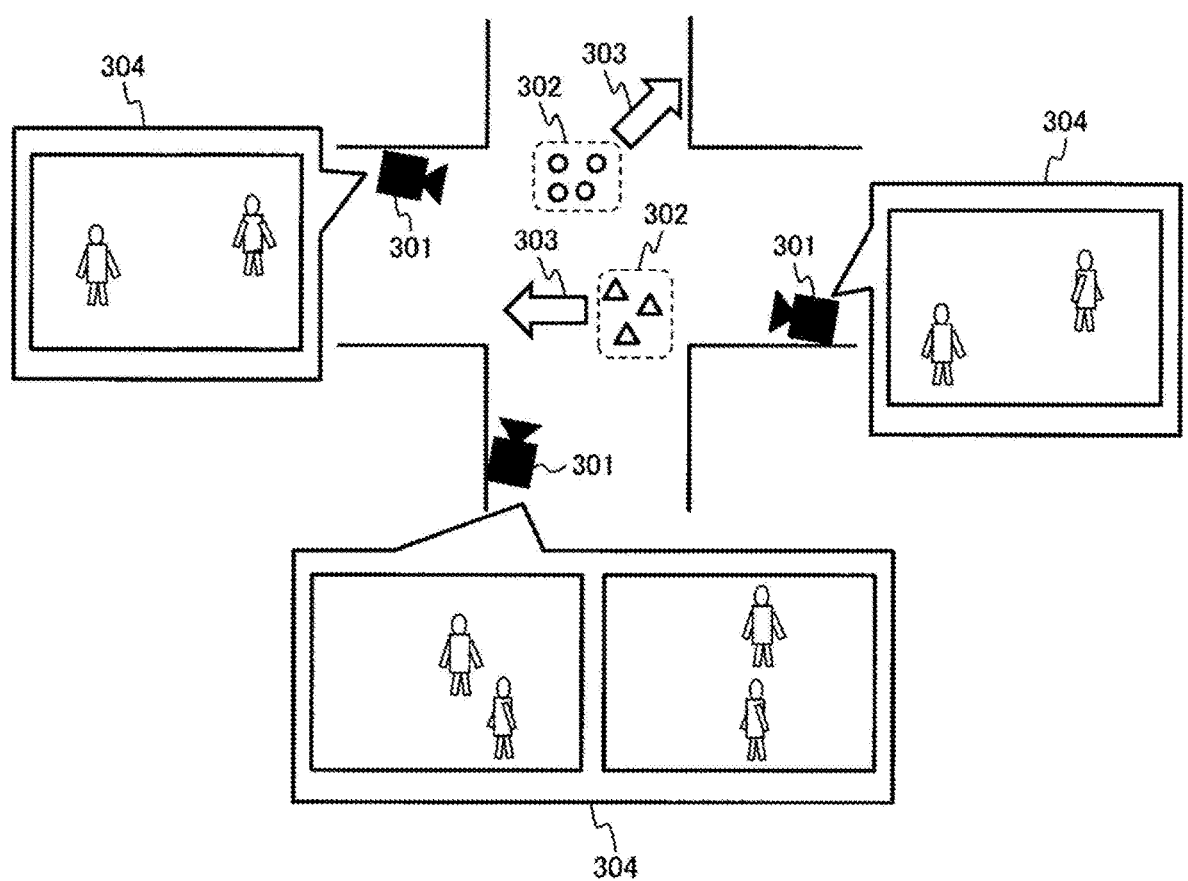
FIG. 12 is a view showing an example of a two-dimensional map outputted by an output unit.

FIG. 12 is a view showing an example of a two-dimensional map outputted by the output unit 109 to an external device. In FIG. 12, a position and an orientation of the camera 100A are displayed by an icon 301 of the camera. Further, the three-dimensional position 201 estimated by the three-dimensional position/synchronization deviation estimation unit 107 is displayed as an icon 302. Here, using a result of motion segmentation, different icons (o or Δ) are used for each group. Further, motion parameters that are traveling directions of individual groups estimated by the three-dimensional position/synchronization deviation estimation unit are displayed by an arrow icon 303. In addition, an image that is the basis of extraction and estimation of the icon 302 and the arrow icon 303 and is selected by the image selection unit 106 is displayed as a balloon 304 near the icon 301 representing each corresponding camera 100A.

(Working Effect)

According to the above-described first embodiment, the following working effects can be obtained.

(1) In the three-dimensional measurement apparatus 100 of the present embodiment, the image selection unit 106 is to select, from the image holding unit 105, an image to be used for estimation by the three-dimensional position/synchronization deviation estimation unit 107, in accordance with an estimation result of the three-dimensional position/synchronization deviation estimation unit 107 and a synchronization deviation held in the synchronization deviation holding unit 108. Therefore, the number of images 202 to be processed by the three-dimensional position/synchronization deviation estimation unit 108 is reduced and the amount of calculation is reduced.

Figure 11:
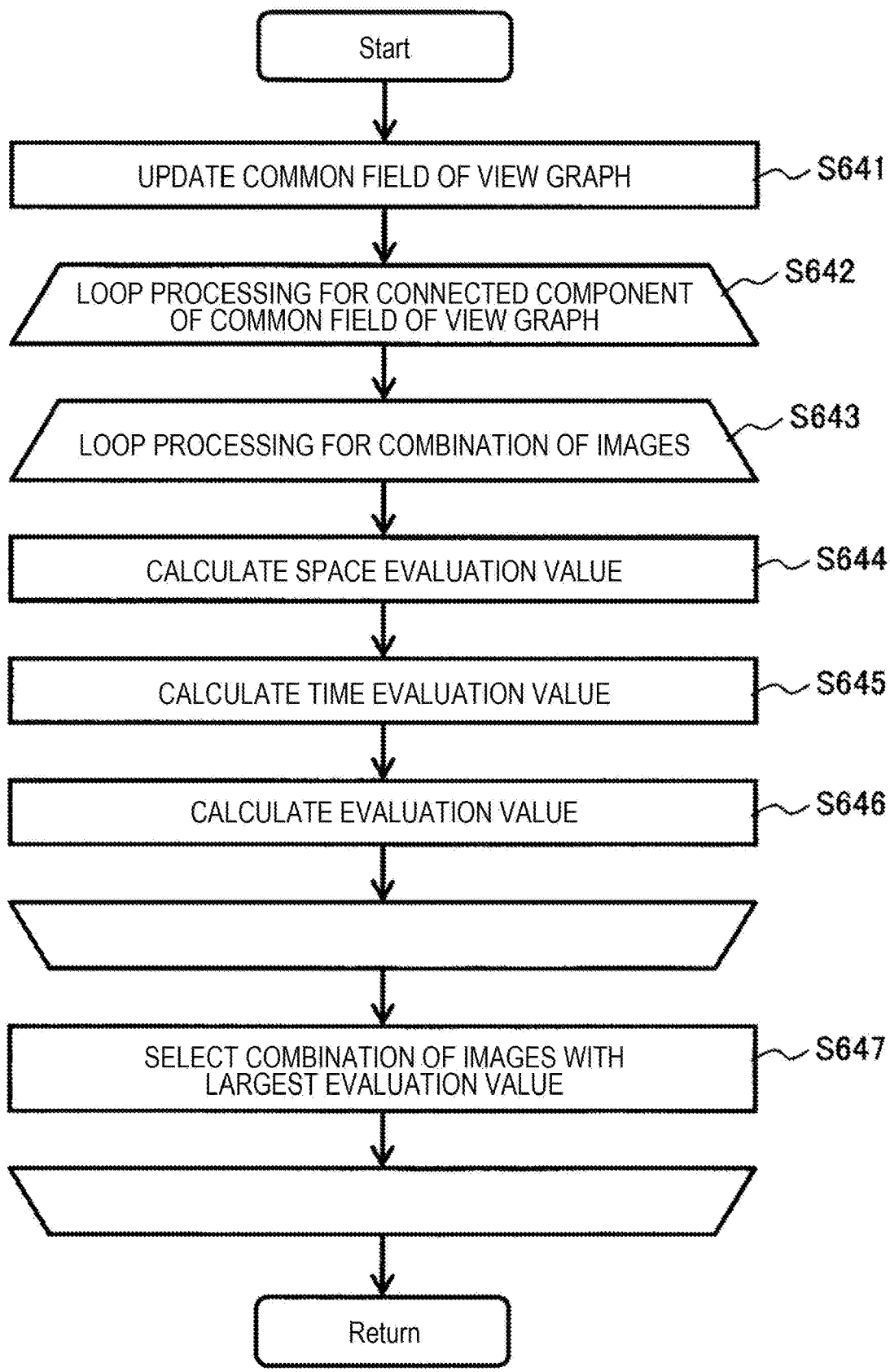
FIG. 11 is a flowchart showing details of processing executed in step S640 of FIG. 10.

(2) The image selection unit 106 calculates a space evaluation value on the basis of a distance between the cameras 100A from a position and an orientation of the camera 100A and the common field of view graph 250 (FIG. 11, step S644), and calculates a time evaluation value from a local photographing time held in the image holding unit 105 and a synchronization deviation held in the synchronization deviation holding unit 108 (FIG. 11, step S645). Further, the image selection unit 106 calculates an evaluation value from a space evaluation value and a time evaluation value, and selects a combination of the images 202 having a high evaluation value (FIG. 11, step S646). Therefore, by selecting the image 202 in which a distance between the cameras 100A is large and a difference between the photographing times is small, the estimation accuracy of the three-dimensional position by the three-dimensional position/synchronization deviation estimation unit 107 is enhanced.

(3) The image selection unit 106 calculates a space evaluation value from a position and an orientation of the camera 100A, the common field of view graph 250, and an estimation result of the three-dimensional position/synchronization deviation estimation unit 107 in the previous processing cycle (step S644 in FIG. 11). Therefore, by selecting the image 202 suitable for measuring a three-dimensional position of the measurement target in the previous processing cycle, the estimation accuracy of the three-dimensional position by the three-dimensional position/synchronization deviation estimation unit 107 is enhanced.

(4) The image selection unit 106 creates the common field of view graph 250 representing a relationship of a common field of view between the cameras 100A from intrinsic and extrinsic parameters of the camera 100A, and selects the image 202 to be used for estimation by the three-dimensional position/synchronization deviation estimation unit 107 from the image holding unit 105, on the basis of the common field of view graph 250 (FIG. 8, FIG. 9, steps S500 to S540, FIG. 11, step S641, step S642, step S644). Therefore, by transmitting and processing only the combination of the images 202 photographed by the camera 100A in which the common field of view exists, the number of images 202 to be transmitted and processed is reduced, and the load on the network server is reduced.

(5) The image selection unit 106 updates the common field of view graph 250 from a feature point matching result in the three-dimensional position/synchronization deviation estimation unit 107 up to the previous processing cycle (FIG. 10, step S600). Therefore, by transmitting and processing only the combination of the images 202 photographed by the camera 100A from which association of feature points is obtained, the number of images 202 to be transmitted and processed is reduced, and the load on the network server is reduced.

(6) The image selection unit 106 determines whether the moving object 150 is currently detected, and extracts, when the moving object 150 is not detected, more images as the selection target image than images when the moving object 150 is detected (FIG. 10, steps S610 to S630). Therefore, by utilizing the time when the moving object 150 is not detected, and executing the processing of the three-dimensional position/synchronization deviation estimation unit 107 with many images as input, the synchronization deviation can be determined with high accuracy, and the synchronization deviation holding unit 108 can be updated. As a result, when the moving object is detected next, by selecting an image on the basis of high precision synchronization deviation, the estimation accuracy of the three-dimensional position by the three-dimensional position/synchronization deviation estimation unit 107 is enhanced.

(7) In the three-dimensional measurement apparatus 100, each camera 100A may be provided with the image acquisition unit 102, the local photographing time acquisition unit 103, the moving object detection unit 104, and the image holding unit 105, while a PC or a server connected to each camera 100A via a network may be provided with the image selection unit 106, the three-dimensional position/synchronization deviation estimation unit 107, the synchronization deviation holding unit 108, and the output unit 109. As a result, since only the image 202 selected by the image selection unit 106 needs to be transmitted from each camera 100A to the server via the network, the number of transmitted images 202 is reduced, and the load on the network can be reduced.

(8) The three-dimensional position/synchronization deviation estimation unit 107 estimates a three-dimensional position of a measurement target, a parameter of a motion model, and a synchronization deviation between the cameras 100A, from a plurality of images 202 photographed by the plurality of cameras 100A and a local photographing time, by minimizing an objective function consisting of a reprojection error with respect to a detection position of a feature point based on camera geometry and a motion model of the measurement target, and a reprojection error with respect to an optical flow calculated from the detection position of the feature point (FIG. 5, FIG. 6, FIG. 7) Therefore, even in the case where there is a synchronization deviation between the cameras 100A, it is possible to estimate the three-dimensional position of the measurement target with high accuracy by considering the synchronization deviation between the cameras 100A and the motion model of the measurement target.

(9) The output unit 109 is to display, on a two-dimensional or three-dimensional map, a position and an orientation of the camera 100A, an image selected by the image selection unit 106, a three-dimensional position of a measurement target estimated by the three-dimensional position/synchronization deviation estimation unit 107, and a parameter of a motion model (FIG. 12). Therefore, a user of the three-dimensional measurement apparatus 100 can easily confirm a measurement result.

(Modification 1)

In the first embodiment described above, the image selection unit 106 uses the average $p_g^W$ of the three-dimensional positions of feature points in the group estimated by the three-dimensional position/synchronization deviation estimation unit 107 in the previous processing cycle, to calculate the space evaluation value $V_s$ (FIG. 11, step S644). However, the method of calculating the space evaluation value $V_s$ is not limited to this.

An image selection unit 106 of Modification 1 calculates a space evaluation value $V_s$ by using a parameter of a motion model of a group estimated by a three-dimensional position/synchronization deviation estimation unit 107 in the previous processing cycle. For example, it is possible to use an angle formed by a three-dimensional vector representing a movement direction of the group calculated from the parameter of the motion model and a three-dimensional vector from a position of one camera 100A of a combination of two cameras 100A to a position of the other camera 100A, to calculate the space evaluation value $V_s$.

According to this Modification 1, the image selection unit 106 selects an image 202 suitable for measuring an object in motion based on the parameter of the motion model as a measurement target in the previous processing cycle. Therefore, there is obtained a working effect that the estimation accuracy of a three-dimensional position by the three-dimensional position/synchronization deviation estimation unit 107 is enhanced.

(Modification 2)

In the first embodiment described above, the image selection unit 106 uses the average $p_g^W$ of the three-dimensional positions of feature points in the group estimated by the three-dimensional position/synchronization deviation estimation unit 107 in the previous processing cycle, to calculate the space evaluation value $V_s$ (FIG. 11, step S644). However, the method of calculating the space evaluation value $V_s$ is not limited to this.

An image selection unit 106 of Modification 2 calculates, for each connected component of a common field of view graph 250, a space evaluation value $V_s$ by using, instead of $p_g^W$, an average of three-dimensional positions 201 of feature points estimated by a three-dimensional position/synchronization deviation estimation unit 107 in all processing cycles.

According to this Modification 2, in an environment where a camera 100A is installed, the image selection unit 106 selects an image 202 suitable for measuring a three-dimensional position where a measurement target is likely to exist. Therefore, there is obtained a working effect that the estimation accuracy of the three-dimensional position by the three-dimensional position/synchronization deviation estimation unit 107 is enhanced.

(Modification 3)

In the above-described first embodiment, the image selection unit 106 calculates the time evaluation value $V_t$ for the selection candidate image by Equation 15, from the global photographing time of the selection candidate image (FIG. 11, step S645). However, the method of calculating the time evaluation value $V_t$ is not limited to this.

An image selection unit 106 according to Modification 3 calculates a time evaluation value $V_t$ for a selection candidate image by Equation 17, from a global photographing time of the selection candidate image.

[Formula 17]

$$V_t = \sigma_r \quad \text{(Equation 17)}$$

According to this Modification 3, the image selection unit 106 selects an image 202 having a large difference in photographing time. Therefore, by selecting the images 202 at various photographing times, it is possible to obtain a working effect that the estimation accuracy of a parameter of a motion model as a measurement target by the three-dimensional position/synchronization deviation estimation unit 107 is enhanced.

(Modification 4)

In the first embodiment described above, the three-dimensional measurement apparatus 100 performs processing on each image acquired by the image acquisition unit 102 from each camera 100A. However, the processing of the three-dimensional measurement apparatus 100 is not limited to this.

In Modification 4, a three-dimensional measurement apparatus 100 performs processing while regarding each camera 100A as a partial camera that photographs a partial image, and regarding each partial image acquired by each partial camera as one image 202. For example, each image 202 is divided into halves in both the x-axis direction and the y-axis direction, to form four partial images. A moving object detection unit 104 determines whether each partial image includes a moving object. An image holding unit 105 holds a partial image that is determined to include a moving object. An image selection unit 106 selects a partial image held in the image holding unit 105. Here, a common field of view graph 250 is created with each partial camera as a node 251. A three-dimensional position/synchronization deviation estimation unit 107 receives the partial image selected by the image selection unit 106 as an input, and estimates a three-dimensional position of a feature point and a synchronization deviation of the cameras. Here, the individual partial cameras obtained by dividing the camera 100A (k) share and use one synchronization deviation $\delta_k$.

According to this Modification 4, the image selection unit 106 creates the common field of view graph 250 representing a relationship of a common field of view between the partial cameras, and selects a partial image to be used for estimation by the three-dimensional position/synchronization deviation estimation unit 107 from the image holding unit 105, on the basis of the common field of view graph 250. Therefore, by transmitting and processing only a combination of partial images photographed by the partial camera in which the common field of view exists, there is obtained working effects that a size of the image to be transmitted and processed is reduced, and the load on the network server is reduced.

Second Embodiment

Figure 14:
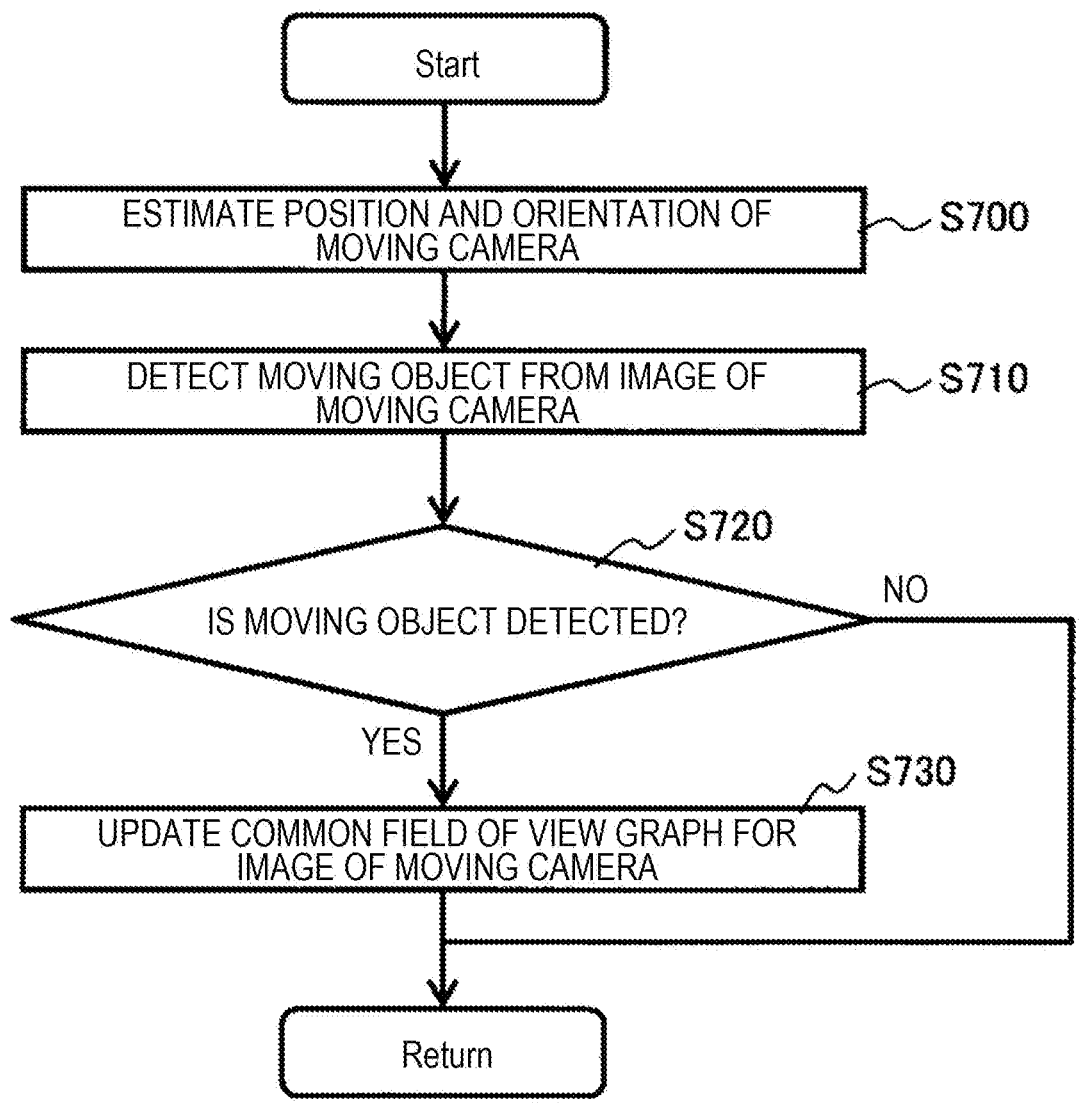
FIG. 14 is a flowchart showing processing of a moving camera processing unit of the second embodiment.
Figure 15:
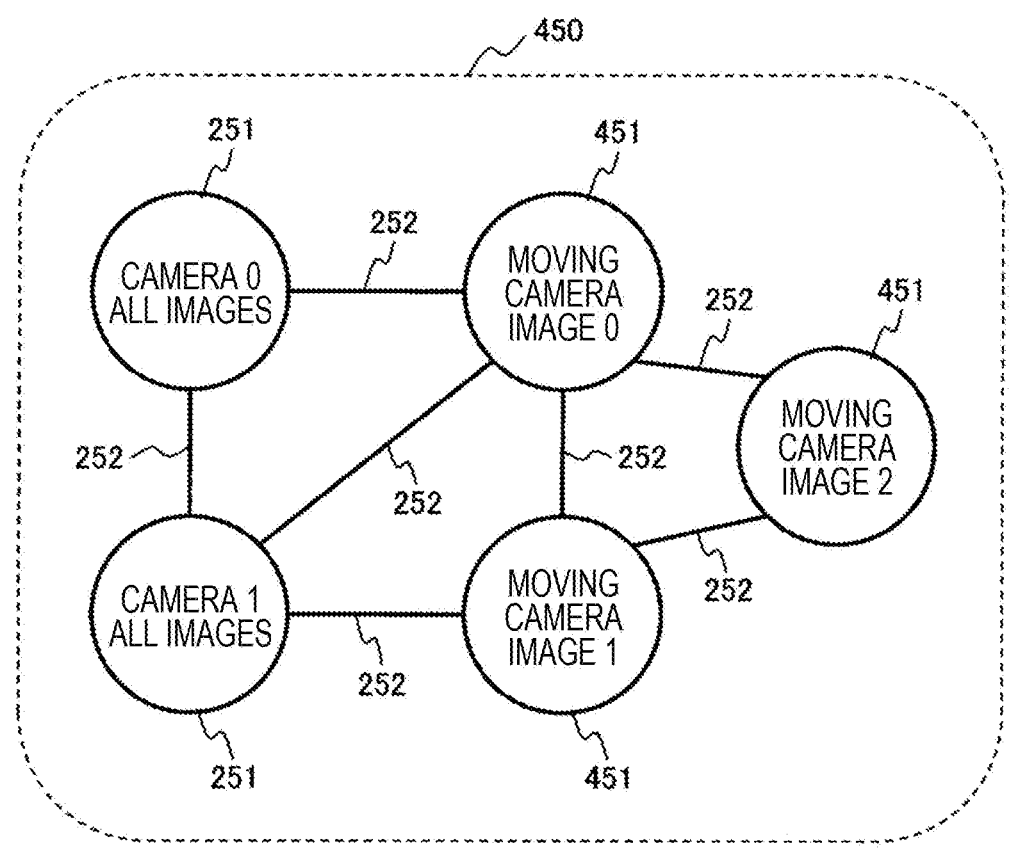
FIG. 15 is a view showing an example of a common field of view graph of the second embodiment.

Hereinafter, a three-dimensional measurement apparatus of a second embodiment will be described with reference to FIGS. 13 to 15. In the following explanation, the same reference numerals are given to the same constituent elements as those of the first embodiment, and the differences will mainly be described. The points not specifically described are the same as those of the first embodiment. The present embodiment is directed to a case where a camera 100A includes a camera whose position and orientation change. Hereinafter, the camera whose position and orientation change is referred to as a moving camera 400A. The moving camera 400A is, for example, a camera mounted on a mobile robot, or a pan-tilt-zoom camera.

(Block Configuration)

Figure 13:
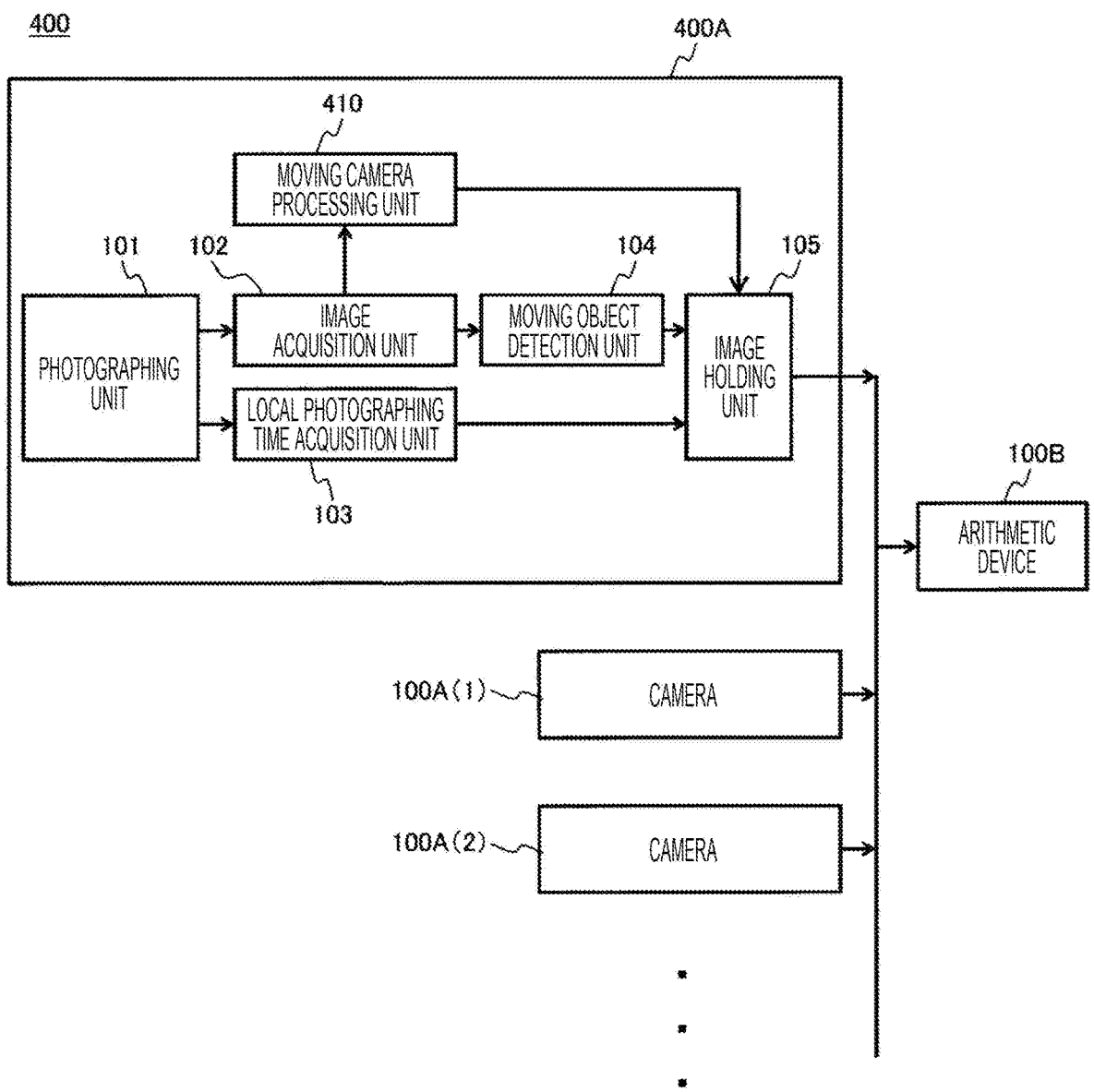
FIG. 13 is a diagram showing a block configuration of a three-dimensional measurement apparatus according to a second embodiment.

FIG. 13 is a diagram showing a block configuration of a three-dimensional measurement apparatus 400. The three-dimensional measurement apparatus 400 of the present embodiment is obtained by adding the moving camera 400A to the configuration of the three-dimensional measurement apparatus 100 of the first embodiment, and the moving camera 400A further includes a moving camera processing unit 410 in addition to the configuration of other cameras 100A. The moving camera processing unit 410 is to process an image photographed by the moving camera 400A whose position and orientation change, and details thereof will be described next.

(Operation of Moving Camera Processing Unit 410)

Next, details of processing in the moving camera processing unit 410 will be described with reference to FIGS. 14 and 15. FIG. 14 is a flowchart showing processing executed by the moving camera processing unit 410, step S700 is a step of estimating a position and an orientation of the moving camera 400A, and step S710 is a step of determining whether an image photographed by the moving camera 400A includes a moving object. In step S720, the process proceeds to step S730 when it is determined in step S710 that a moving object is included, and the processing of the moving camera processing unit 410 is ended when it is determined that no moving object is included. In step S730, a common field of view graph for the image photographed by the moving camera 400A is updated. Each step will be described in detail below.

First, in step S700, from an image acquired by an image acquisition unit 102, a position and an orientation of the moving camera 400A at the time when the image has been photographed are estimated. For the estimation of the position and the orientation of the moving camera 400A, a known method such as a Structure from Motion method or a Visual Simultaneous Localization and Mapping (vSLAM) method can be used. For example, as the vSLAM method, "G. Klein and D. Murray, Parallel Tracking and Mapping for Small AR Workspaces, Proc. IEEE and ACM Int. Symp. On Mixed and Augmented Reality, pp. 225-234, 2007" can be used. In addition, a sensor for measurement of the position and the orientation may be added to the moving camera 400A. For example, when using an inertial measurement unit (IMU) as a sensor, it is possible to estimate the position and the orientation by integrating an acceleration and an angular velocity measured by the IMU.

In the next step S710, it is determined whether the image acquired by the image acquisition unit 102 includes a moving object. For the determination, for example, it is possible to use a known technique for determining a remaining optical flow as a moving object, as a result of removing an optical flow due to movement of the moving camera 400A from an optical flow between temporally consecutive images. In addition, it may be determined that a moving object is present, when a large number of outliers are included in the feature point association between temporally consecutive images used in the vSLAM method.

In step S730, a common field of view graph for the image photographed by the moving camera 400A is updated. FIG. 15 is a view showing an example of a common field of view graph 450 in the three-dimensional measurement apparatus 400. This common field of view graph 450 includes, in addition to a node 251 corresponding to a fixed camera, a node 451 prepared for each image photographed by the moving camera 400A. The reason to handle as different node 451 for each image is that a position and an orientation of an image photographed by the moving camera 400A are highly likely different for each image.

In this step S730, first, the node 451 corresponding to an image acquired by the image acquisition unit 102 is added to the common field of view graph 450. Next, when the common field of view exists, an edge 252 is added from the added node 451 to the nodes 251 and 451 already existing in the common field of view graph 450. Specifically, with one in a combination as the added node 451, the processing from step S510 to step S540 for creating the common field of view graph 250 in the three-dimensional measurement apparatus 100 is executed.

Here, a calculation cost of the processing of step S730 is proportional to the number of nodes 251 and 451 present in the common field of view graph 450. Therefore, in order to limit the processing time, the number of nodes 251 and 451 in the common field of view graph 450 is to be limited. Specifically, the node 451 corresponding to an image whose local photographing time is at least a certain time before the most recent local photographing time of each of the camera 100A and the moving camera 400A, and the edge 252 connected to the node 451 are deleted from the common field of view graph 450.

(Working Effect)

According to the second embodiment described above, in the three-dimensional measurement apparatus 400, the moving camera processing unit 410 estimates a position and an orientation at a time of photographing an image, detects a moving object, and updates a common field of view graph from an image of the moving camera 400A acquired by the image acquisition unit 102. Therefore, even in a case of using the moving camera 400A whose position and orientation change as the camera 100A, it is possible to obtain a working effect that it is possible to measure the three-dimensional position with high accuracy while reducing the load on the network server.

The present invention is not limited to the above embodiments, and various modifications may be included. For example, the above embodiments have been illustrated in detail to facilitate description for easy understanding of the present invention, and are not necessarily limited to the embodiments that include all the illustrated configurations. Other aspects considered within the technical idea of the present invention are also included within the scope of the present invention. Additionally, a part of a configuration of an embodiment may be replaced with a configuration of another embodiment, and a configuration of an embodiment may be added with a configuration of another embodiment. Moreover, a part of a configuration of each embodiment may be deleted, replaced, or added with another configuration. In addition, each of the above-described configurations, functions, processing parts, processing units, and the like may be realized by hardware, for example, by designing part or all of them with an integrated circuit or the like. In addition, each of the above-described configurations, functions, and the like may be realized by software by interpreting and executing a program in which a processor realizes each function. Information such as a program, a table, and a file for realizing each function can be placed in a recording device such as a memory, a hard disk, or a solid state drive (SSD), or in a recording medium such as an IC card, an SD card, or a DVD.

REFERENCE SIGNS LIST 100 three-dimensional measurement apparatus
100A camera
100B arithmetic device
101 photographing unit
102 image acquisition unit
103 local photographing time acquisition unit
104 moving object detection unit
105 image holding unit
106 image selection unit
107 three-dimensional position/synchronization deviation estimation unit
108 synchronization deviation holding unit
109 output unit
150 moving object
200 reprojection error with respect to detection position of feature point
210 reprojection error with respect to optical flow
250, 450 common field of view graph
251, 451 node
252 edge
400 three-dimensional measurement apparatus
400A moving camera
410 moving camera processing unit

The invention claimed is:

1. A three-dimensional measurement apparatus in which a plurality of cameras and an arithmetic device are connected via a network, the three-dimensional measurement apparatus comprising:
a plurality of photographing units;
an image acquisition unit to acquire an image from each of the photographing units;
a local photographing time acquisition unit to acquire a local time at which the image has been photographed;
a moving object detection unit to detect a moving object from the image;
an image holding unit to hold an image in which the moving object is detected, in association with the local time at which the image has been photographed;
an image selection unit to select a plurality of images held in the image holding unit;
a three-dimensional position/synchronization deviation estimation unit to estimate a three-dimensional position of the moving object and a synchronization deviation between cameras, from an image selected by the image selection unit and a local time associated with the image;
a synchronization deviation holding unit to hold the synchronization deviation; and
an output unit to output an estimation result of the three-dimensional position/synchronization deviation estimation unit,
wherein the image selection unit generates a common field of a view graph wherein each node in the graph includes nodes respectfully representing a camera of the plurality of cameras and each edge in the graph represents that the respective cameras on either side of the edge have a common field of view, and
wherein the image selection unit select and acquires the plurality of images based on relationships of the cameras indicated by the common field of view graph, and updates the common field of view graph based on the plurality of images selected by the image selection unit by removing a node representing a camera which did not acquire an image of at least one of the plurality of images selected by image selection unit and the edges connected to the node to be removed.

2. The three-dimensional measurement apparatus according to claim 1, wherein the image selection unit selects and acquires an image based on a space evaluation value calculated from a distance between the cameras, and
wherein a time evaluation value calculated from a local photographing time held in the image holding unit, and a synchronization deviation held in the synchronization deviation holding unit.

3. The three-dimensional measurement apparatus according to claim 2,
wherein the image selection unit selects and acquires an image based on a space evaluation value calculated from an estimation result of the three-dimensional position/synchronization deviation estimation unit.

4. The three-dimensional measurement apparatus according to claim 1, wherein
the image selection unit updates a relationship of the common field of view graph between the cameras based on a processing result of the three-dimensional position/synchronization deviation estimation unit.

5. The three-dimensional measurement apparatus according to claim 1, wherein
the image selection unit determines that a moving object is not detected when the image holding unit is not updated for a certain time, and selects and acquires more images than images when a moving object is detected.

6. The three-dimensional measurement apparatus according to claim 1,
wherein the camera is provided with the photographing unit, the image acquisition unit, the local photographing time acquisition unit, the moving object detection unit, and the image holding unit; or the photographing unit is provided in the camera.

7. The three-dimensional measurement apparatus according to claim 1, wherein
by minimizing an objective function based on camera geometry and a motion model of a measurement target, the three-dimensional position/synchronization deviation estimation unit estimates a three-dimensional position of a measurement target, a parameter of a motion model, and a synchronization deviation between cameras.

8. The three-dimensional measurement apparatus according to claim 1, wherein
the output unit displays, on a two-dimensional or three-dimensional map, a position and an orientation of the camera, the image selected by the image selection unit, a three-dimensional position of a measurement target and a parameter of a motion model estimated by the three-dimensional position/synchronization deviation estimation unit.

9. The three-dimensional measurement apparatus according to claim 4, wherein
the plurality of cameras include a moving camera whose position and orientation change, and
the three-dimensional measurement apparatus further comprises a moving camera processing unit that estimates a position and an orientation of the moving camera, detects a moving object, and updates a relationship of a common field of view among the plurality of cameras from an image photographed by the moving camera.

\* \* \* \* \*